(12) United States Patent
Lindberg et al.

(10) Patent No.: US 11,905,797 B2
(45) Date of Patent: Feb. 20, 2024

(54) WELLBORE FOR EXTRACTING HEAT FROM MAGMA BODIES

(71) Applicant: EnhancedGEO Holdings, LLC, St. Petersburg, FL (US)

(72) Inventors: Greg Lindberg, Thonotosassa, FL (US); Kimberly C. Conner, Wetumpka, AL (US)

(73) Assignee: EnhancedGEO Holdings, LLC, St. Petersburg, FL (US)

( * ) Notice: Subject to any disclaimer, the term of this patent is extended or adjusted under 35 U.S.C. 154(b) by 0 days.

(21) Appl. No.: 18/105,674

(22) Filed: Feb. 3, 2023

(65) Prior Publication Data

US 2023/0349265 A1 Nov. 2, 2023

Related U.S. Application Data

(60) Provisional application No. 63/337,129, filed on May 1, 2022.

(51) Int. Cl.
*E21B 41/00* (2006.01)
*F03G 4/00* (2006.01)
*E21B 33/04* (2006.01)
*E21B 7/00* (2006.01)

(52) U.S. Cl.
CPC .............. *E21B 41/00* (2013.01); *E21B 7/00* (2013.01); *E21B 33/04* (2013.01); *F03G 4/023* (2021.08)

(58) Field of Classification Search
CPC ........... E21B 41/00; E21B 33/04; F03G 4/023
See application file for complete search history.

(56) References Cited

U.S. PATENT DOCUMENTS

| 3,498,381 A | 3/1970 | Earlougher, Jr. |
| 3,613,806 A * | 10/1971 | Malott ............... E21B 21/08 175/218 |
| 3,757,516 A * | 9/1973 | McCabe ............. F24T 10/20 165/45 |

(Continued)

FOREIGN PATENT DOCUMENTS

| AU | 2018308861 A1 | 1/2020 |
| AU | 2017268378 B2 | 9/2021 |

(Continued)

OTHER PUBLICATIONS

John L. Colp, Final Report—Magma Energy Research Project, Oct. 1982, Sandia National Laboratories, All Pages (Year: 1982).*

(Continued)

*Primary Examiner* — Cathleen R Hutchins
*Assistant Examiner* — Ronald R Runyan
(74) *Attorney, Agent, or Firm* — Stephen Y. Liu; Carstens, Allen & Gourley, LLP

(57) ABSTRACT

Wellbore for extracting heat from magma and a corresponding method. The method includes the steps of drilling a borehole from a surface and towards a magma chamber; supplying a drilling fluid to an interface between a drill bit and a terminal end of the borehole during drilling; terminating the drilling in response to the borehole achieving a predetermined depth; and supplying a thermodynamic fluid into the borehole to maintain the borehole while completing the wellbore. The drilling fluid lifts cuttings out of the borehole and quenches magma to form a solid phase material that can be cut by the drill bit.

18 Claims, 16 Drawing Sheets

(56) References Cited

U.S. PATENT DOCUMENTS

| | | | |
|---|---|---|---|
| 3,765,477 A | 10/1973 | Van | |
| 3,864,208 A | 2/1975 | Van | |
| 3,950,949 A | 4/1976 | Martin et al. | |
| 3,957,108 A * | 5/1976 | Van Huisen | F24T 10/20 165/45 |
| 3,967,675 A | 7/1976 | Georgii | |
| 4,043,129 A | 8/1977 | McCabe et al. | |
| 4,047,093 A | 9/1977 | Levoy | |
| 4,054,176 A | 10/1977 | Huisen | |
| 4,057,108 A * | 11/1977 | Broussard | E21B 41/02 166/371 |
| 4,116,285 A * | 9/1978 | Guerber | E21B 7/001 507/143 |
| 4,140,184 A | 2/1979 | Bechtold et al. | |
| 4,492,083 A | 1/1985 | McCabe et al. | |
| 4,642,987 A | 2/1987 | Csorba et al. | |
| 4,665,705 A | 5/1987 | Bonham, Jr. | |
| 4,776,169 A | 10/1988 | Coles, Jr. | |
| 4,929,348 A | 5/1990 | Rice | |
| 5,513,573 A * | 5/1996 | Sutton | B61B 13/10 104/138.1 |
| 5,860,279 A | 1/1999 | Bronicki et al. | |
| 5,911,684 A * | 6/1999 | Shnell | F24T 10/20 60/659 |
| 6,708,494 B1 | 3/2004 | Hamann | |
| 7,124,584 B1 | 10/2006 | Wetzel et al. | |
| 8,011,450 B2 | 9/2011 | Krueger et al. | |
| 8,047,285 B1 | 11/2011 | Smith | |
| 8,201,409 B1 | 6/2012 | Zakiewicz | |
| 8,524,787 B2 | 9/2013 | Ermolaev et al. | |
| 9,006,298 B2 | 4/2015 | Leviness et al. | |
| 9,108,858 B2 | 8/2015 | McDonald et al. | |
| 9,150,423 B2 | 10/2015 | Hosono et al. | |
| 9,182,149 B2 | 11/2015 | Gilaberte et al. | |
| 9,298,756 B1 | 3/2016 | Johnson | |
| 9,359,271 B2 | 6/2016 | Leviness et al. | |
| 9,388,797 B2 | 7/2016 | Bronicki | |
| 9,738,835 B2 | 8/2017 | Schrauwen | |
| 9,765,605 B2 | 9/2017 | Williamson et al. | |
| 10,017,395 B2 | 7/2018 | Kageyama et al. | |
| 10,058,848 B2 | 8/2018 | Lipiec et al. | |
| 10,131,545 B2 | 11/2018 | Sekine et al. | |
| 10,173,202 B2 | 1/2019 | Hosono et al. | |
| 10,203,162 B2 | 2/2019 | Yokomine et al. | |
| 10,322,940 B2 | 6/2019 | Hosono et al. | |
| 10,344,233 B2 | 7/2019 | Lucas et al. | |
| 10,358,604 B2 | 7/2019 | Harris et al. | |
| 10,710,049 B2 | 7/2020 | Mikhajlov et al. | |
| 10,745,625 B2 | 8/2020 | Dogterom et al. | |
| 10,759,668 B2 | 9/2020 | Hosono et al. | |
| 10,792,645 B2 | 10/2020 | Hosono et al. | |
| 10,974,969 B2 | 4/2021 | Hu et al. | |
| 11,131,484 B2 * | 9/2021 | McBay | F03G 7/04 |
| 11,235,310 B2 | 2/2022 | Hosono et al. | |
| 11,286,169 B2 | 3/2022 | Beach et al. | |
| 11,325,105 B2 | 5/2022 | Beach et al. | |
| 2004/0265158 A1 | 12/2004 | Boyapati et al. | |
| 2006/0026961 A1 | 2/2006 | Bronicki | |
| 2006/0180537 A1 | 8/2006 | Loftis et al. | |
| 2008/0213157 A1 | 9/2008 | McGrady et al. | |
| 2010/0045042 A1 | 2/2010 | Hinders et al. | |
| 2012/0144829 A1 | 6/2012 | Wiggs et al. | |
| 2013/0234444 A1 | 9/2013 | Rogers et al. | |
| 2013/0333383 A1 | 12/2013 | Schwarck | |
| 2014/0262137 A1 | 9/2014 | McBay | |
| 2015/0128931 A1 | 5/2015 | Joshi et al. | |
| 2015/0300327 A1 | 10/2015 | Sweatman et al. | |
| 2015/0368565 A1 | 12/2015 | Schrauwen | |
| 2015/0377211 A1 | 12/2015 | Occhiello | |
| 2016/0097376 A1 | 4/2016 | Wasyluk et al. | |
| 2016/0115945 A1 | 4/2016 | Barsi et al. | |
| 2016/0251953 A1 | 9/2016 | Samuel et al. | |
| 2016/0363350 A1 | 12/2016 | Tahara | |
| 2017/0253492 A1 | 9/2017 | Beach et al. | |
| 2018/0106138 A1 | 4/2018 | Randolph | |
| 2018/0224164 A1 | 8/2018 | Lakic | |
| 2020/0040267 A1 | 2/2020 | Willigenburg et al. | |
| 2020/0072199 A1 | 3/2020 | Fontana et al. | |
| 2020/0231455 A1 | 7/2020 | Beach et al. | |
| 2020/0325030 A1 | 10/2020 | Cussler et al. | |
| 2020/0353518 A1 | 11/2020 | Chandran et al. | |
| 2021/0114005 A1 | 4/2021 | Tao et al. | |
| 2021/0122656 A1 | 4/2021 | Willberg et al. | |
| 2023/0130169 A1 | 4/2023 | McIntyre | |
| 2023/0272947 A1 | 8/2023 | Lindberg et al. | |

FOREIGN PATENT DOCUMENTS

| | | | |
|---|---|---|---|
| AU | 2016398360 B2 | 1/2022 | |
| CN | 108952650 A | 12/2018 | |
| CN | 113494273 A | 10/2021 | |
| EP | 0236640 A1 | 9/1987 | |
| EP | 0326736 A2 * | 7/1988 | F24J 3/08 |
| EP | 2792010 B1 | 1/2018 | |
| EP | 3583321 A1 | 12/2019 | |
| GB | 2592695 A | 9/2021 | |
| JP | h07286760 A | 10/1995 | |
| JP | 2011052621 A | 3/2011 | |
| JP | 2014202149 A | 10/2014 | |
| JP | 2020067027 A | 4/2020 | |
| WO | WO-2009116873 A1 * | 9/2009 | F24T 10/00 |
| WO | 2012079078 A2 | 6/2012 | |
| WO | 2012037571 A3 | 7/2012 | |
| WO | 2013025640 A2 | 2/2013 | |
| WO | 2016204287 A1 | 12/2016 | |
| WO | 2020150245 A1 | 7/2020 | |
| WO | 2020160500 A1 | 8/2020 | |
| WO | 2021257944 A9 | 4/2022 | |
| WO | 2022211643 A1 | 10/2022 | |

OTHER PUBLICATIONS

Boehm, R.F. et al, Modelling of a Magma Energy Geothermal Power Plant, presented at ASME Winter Annual Meeting, Boston MA, Dec. 1987, SAND-87-0564C, DE88 003793, 11 pages.

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

* cited by examiner

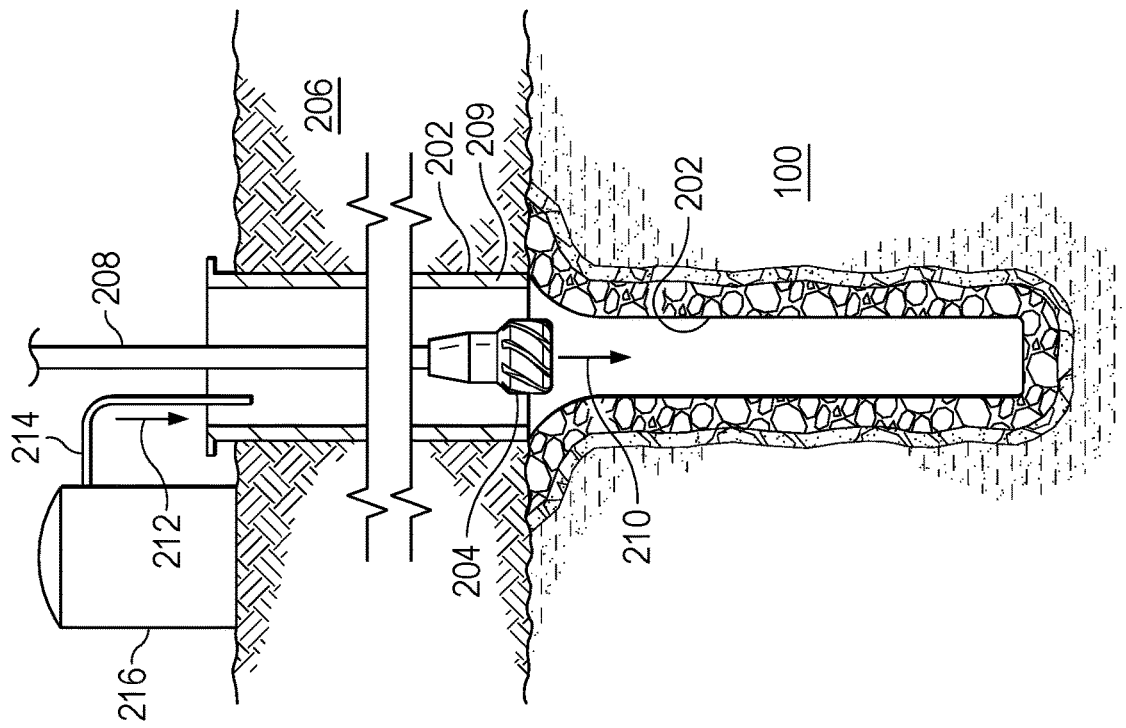
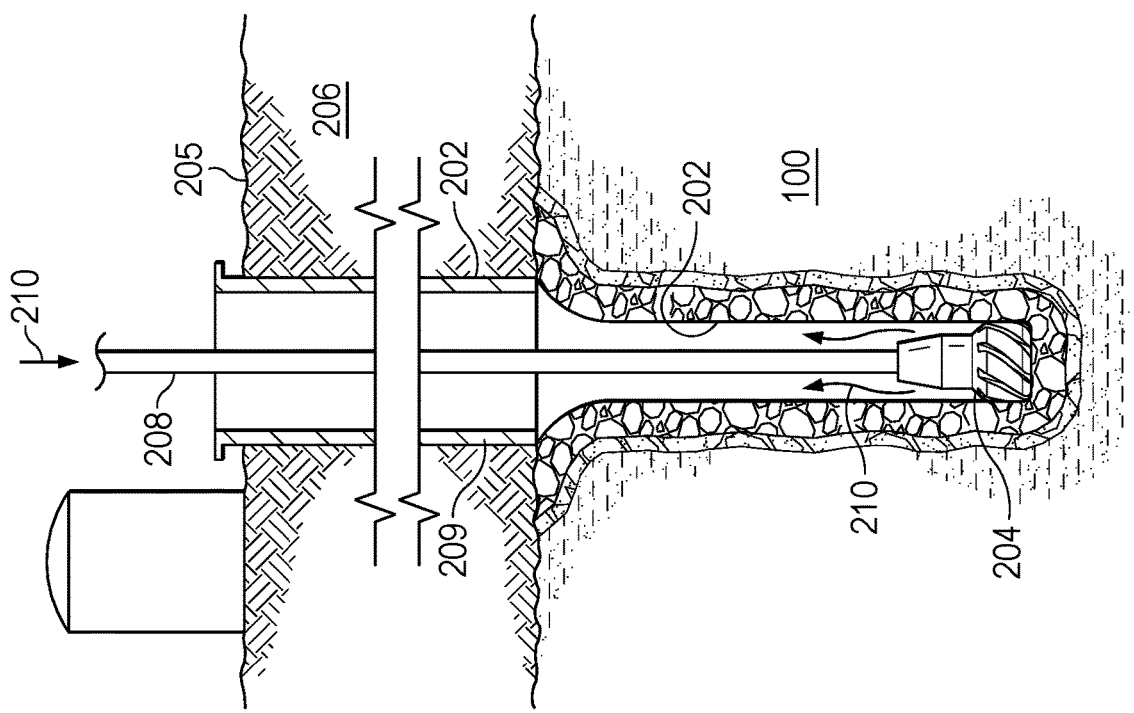
FIG. 2A
FIG. 2B

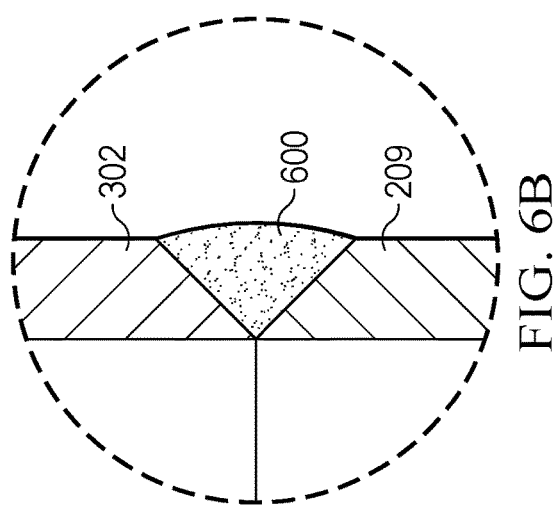
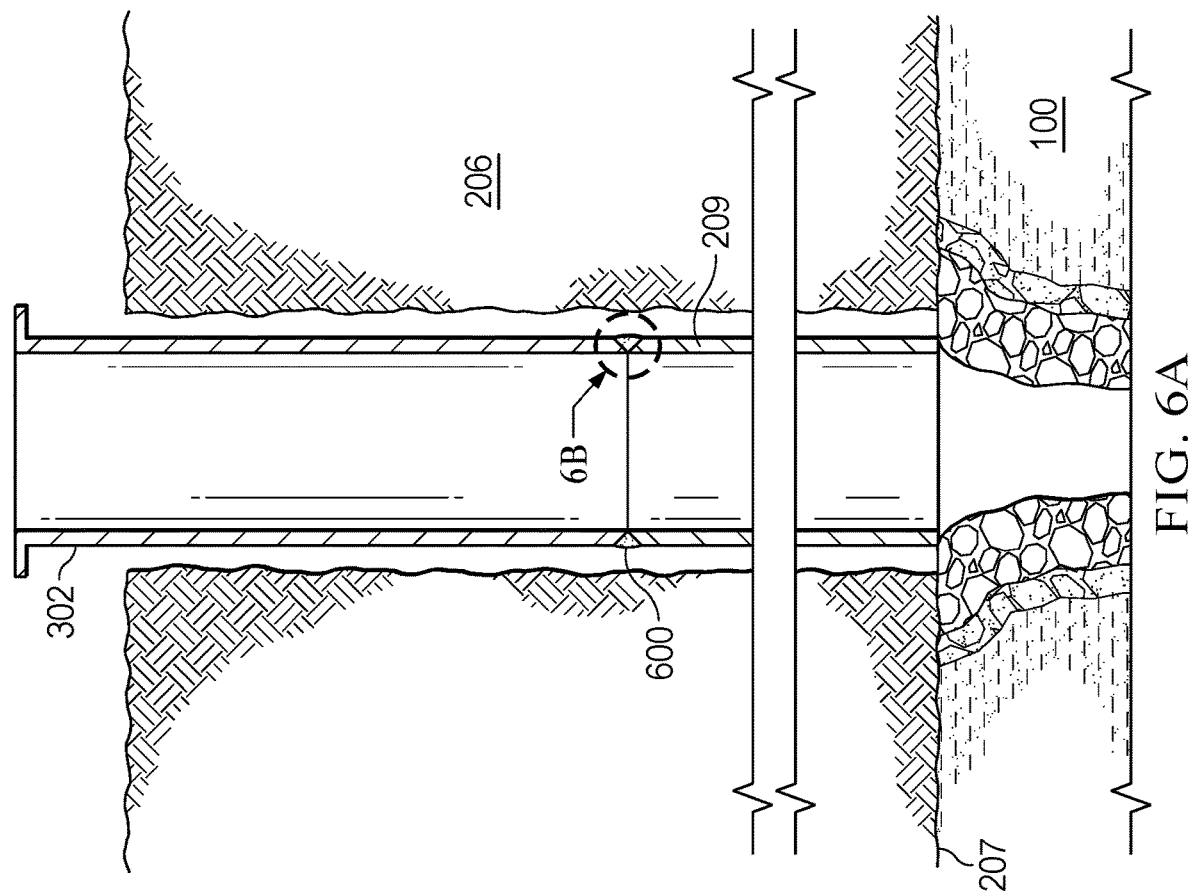

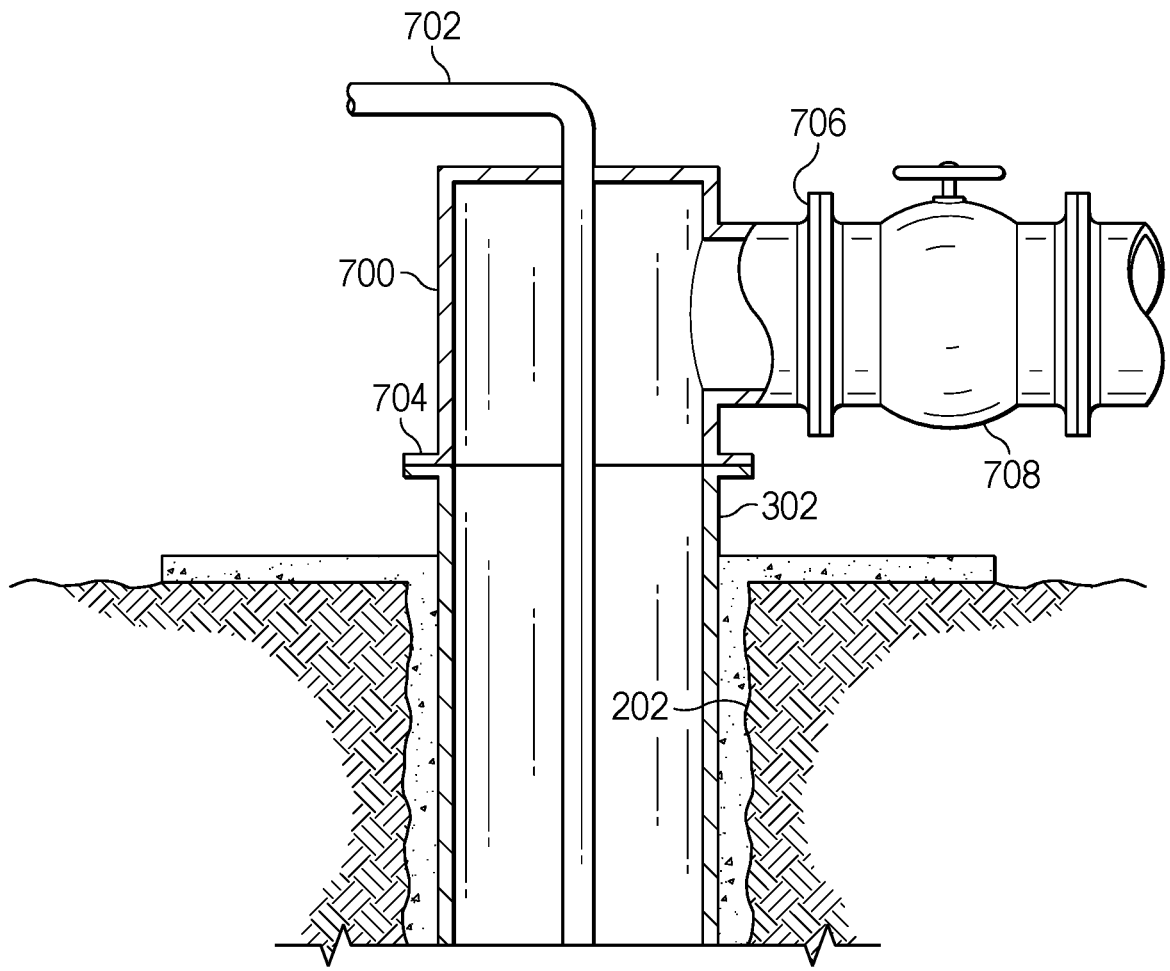
FIG. 7A
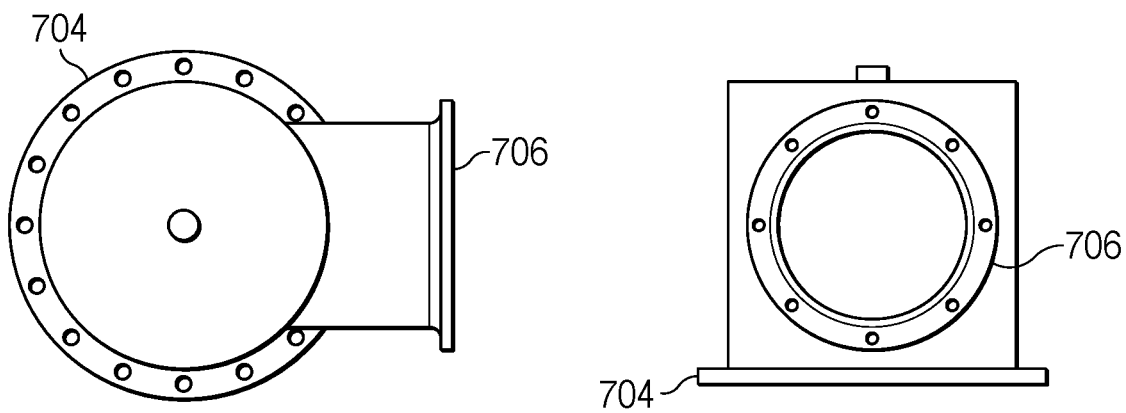
FIG. 7B
FIG. 7C

WELLBORE FOR EXTRACTING HEAT FROM MAGMA BODIES

CROSS-REFERENCE TO RELATED APPLICATIONS

This application claims priority to U.S. Provisional Application No. 63/337,129, filed on May 1, 2022, which is hereby incorporated by reference in its entirety.

TECHNICAL FIELD

Aspects of the present disclosure relate to geothermal power systems and related methods, and more particularly to wellbores for extracting heat from magma bodies.

BACKGROUND

Solar power, wind power, and hydroelectric power are the most commonly available sources of renewable energy, but all are notoriously unreliable and have relatively poor power densities. In contrast, geothermal energy has the potential to offer high power density and is capable of operating despite weather conditions or time of day. However, the lack of necessary technological advances renders geothermal energy an impractical substitute.

SUMMARY

Aspects of the present disclosure are directed to a wellbore for extracting heat from magma. The wellbore includes a borehole with an opening at a surface and a terminal end at a predetermined depth within a magma chamber, a casing disposed within the borehole and extending from the surface at least until a ceiling of the magma chamber; a wellhead coupled with the casing at the surface; and a fluid conduit passing through the wellhead. The fluid conduit provides a working fluid to the terminal end of the wellbore.

Aspects of the present disclosure are also directed to a method for completing a wellbore for extracting heat from magma. The method includes the steps of drilling a borehole from a surface and towards a magma chamber; supplying a drilling fluid to an interface between a drill bit and a terminal end of the borehole during drilling; terminating the drilling in response to the borehole achieving a predetermined depth; and supplying a thermodynamic fluid into the borehole to maintain the borehole while completing the wellbore. The drilling fluid lifts cuttings out of the borehole and quenches magma to form a solid phase material that can be cut by the drill bit.

Other aspects, embodiments and features of the disclosure will become apparent from the following detailed description of the disclosure when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the disclosure shown where illustration is not necessary to allow those of ordinary skill in the art to understand the disclosure.

BRIEF DESCRIPTION OF THE FIGURES

Features of the disclosure are set forth in the appended claims. The disclosure itself, however, as well as a preferred mode of use, further objectives and advantages thereof, will be best understood by reference to the following detailed description of illustrative embodiments when read in conjunction with the accompanying figures, wherein:

FIGS. 2A-2D are various sectional views depicting steps of drilling into a magma body according to an illustrative embodiment;

FIGS. 6A and 6B are various simplified sectional views of a wellbore casing and a more detailed view of a casing weld according to an illustrative embodiment;

FIGS. 7A-7C are various views of a wellhead that can be used to cap off a wellbore according to an illustrative embodiment;

DETAILED DESCRIPTION

Figure 1:
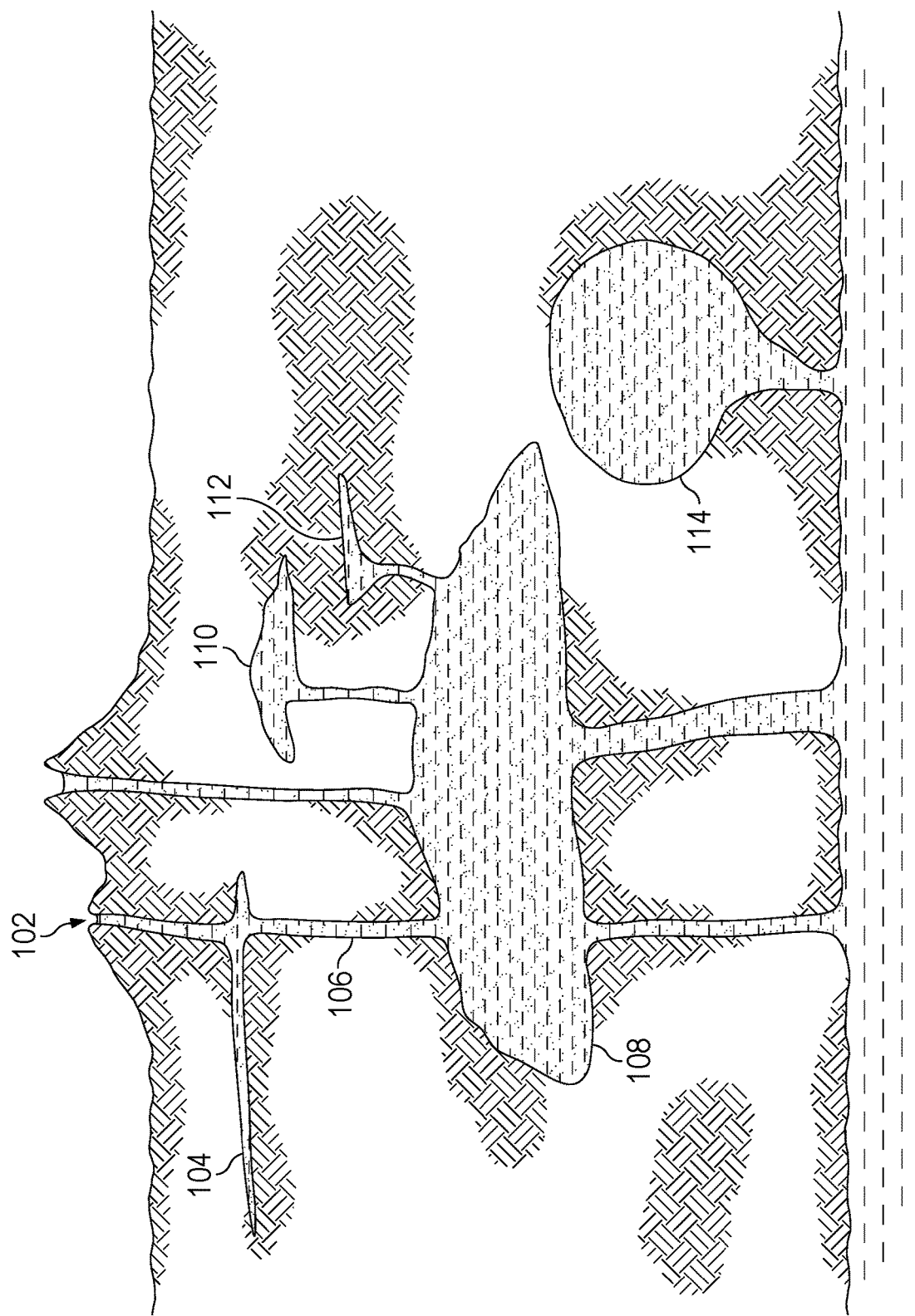
FIG. 1 is a sectional view of the Earth's mantle depicting various underground magma bodies that can be tapped for harnessing geothermal energy in accordance with various illustrative embodiments.

Conventional renewable energy systems—such as solar, hydroelectric, or wind-based systems—are generally inefficient, rendering them impractical as replacements for traditional fossil fuels. Additionally, the production of energy from these renewable resources is unpredictable. Geothermal energy has shown some early promise; however, most conventional geothermal systems tap into low temperature resources, such as low temperature geothermal water having temperatures of less than 194° F. Low temperature geothermal water yields low power output. The inability to efficiently and reliably access high-temperature geothermal resources renders conventional geothermal systems financially impractical. These existing geothermal energy systems also create undesirable pollutants and greenhouse gasses.

Magma is abundant and constitutes a majority of the Earth's mass and could serve as an adequate source of geothermal energy, but conventional systems and methods of harnessing renewable energy from geothermal resources are unsuitable for harnessing renewable energy from magma due to its high heat. For example, boreholes drilled into magma bodies are notoriously difficult to create and maintain due to the high heat, which causes the boreholes to collapse. In addition, magma can cause excessive wear and fatigue and fouling of drilling equipment.

This disclosure recognizes the need for a geothermal power system that takes advantage of a geothermal resource with a sufficiently high temperature that can provide high-temperature, high-pressure gaseous phase fluid, which avoids problems associated with conventional wells that have to contend with low permeability.

Certain benefits and improvements provided by this disclosure may be based on the following unexpected observations: magma can be relative shallow at a depth of about 2.1-2.5 km; the top layer of magma has few crystals with no mush zone; rock is not ductile and can support fractures; no decline in thermal output over a two-year period; eruptions at drill sites are unlikely (e.g., eruptions have not happened at the African and Icelandic drill sites in over 10,000 years and it is believed the Kilauea, Hawaii drill site has never erupted); drilling into magma is reasonably safe, and rising magma can be quenched with water to form a rock plug.

The disclosure describes a system and method of drilling a borehole through rock and into a magma body and then maintaining the borehole after creation. The method includes the use of a selected thermodynamic fluid, such as a drilling fluid or a working fluid, with sufficient thermodynamic properties to maintain the integrity and dimensional characteristics of the wellbore while the geothermal well is being drilled and completed. In particular, the thermodynamic fluid should have thermodynamic properties and a thermal mass so that the latent heat of crystallization of the magma can be transferred to the thermodynamic fluid. In this way, a thermodynamic fluid can be used as a drilling fluid to quench magma, such that a drill bit can then drill into the magma. The same or a different thermodynamic fluid can then be used to maintain the well, for example, by preventing or limiting remelting of solidified magma in the drilled region.

FIG. 1 is a sectional view of the Earth's mantle depicting various underground magma bodies that can be tapped for harnessing geothermal energy in accordance with various illustrative embodiments. Non-limiting examples of magma bodies that can provide geothermal energy are depicted in FIG. 1. These magma bodies can include a cone 102, sill 104, dyke 106, pluton 108, laccolith 110, lapolith 112, and/or diapir 114.

In the various embodiments disclosed herein, geothermal energy is harnessed by a geothermal well, i.e., a well that includes a borehole extending from a surface of the Earth into one or more magma bodies 102-114 and equipment for maintaining the borehole and extracting fluid for power generation. Thus, the geothermal well can include casing, fluid conduits, insulation, wellheads, etc. The term "wellbore" or "magma well" may be used interchangeably with "geothermal well". Exemplary geothermal wells are depicted in FIGS. 3, 4A, 5, 8, 9, and 11. These wells can be capped with a wellhead, such as wellhead 700 in FIG. 7A-C, and have an optional casing extending at least partially the length of the borehole, such as casing 209 in FIGS. 2A-2D and FIG. 4A. The well can be part of a system, shown in FIG. 10, for generating renewable energy from the working fluid injected into the well. High-level steps for drilling into a magma body to complete the renewable energy generation system are shown generally in FIGS. 2A-2D.

Figure 2C:
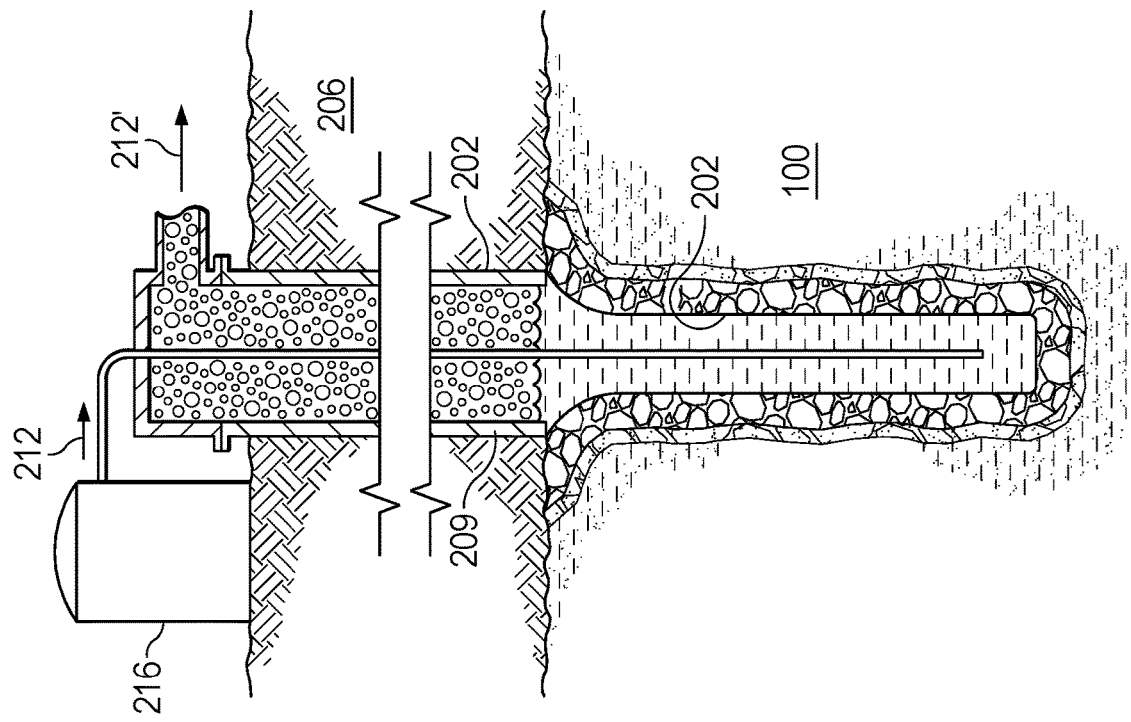
Figure 9:
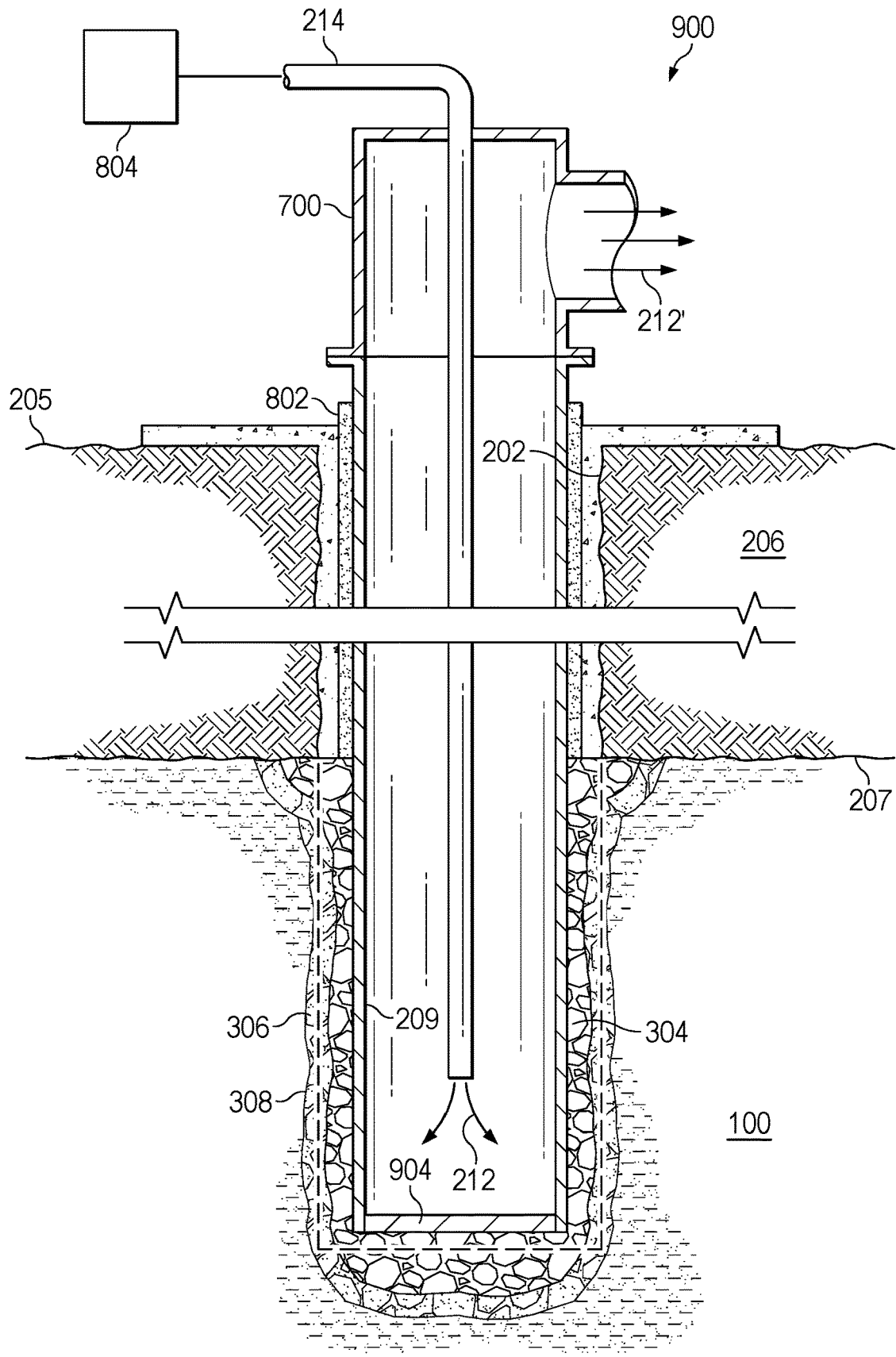
FIG. 9 is a simplified sectional view of a fully cased wellbore producing saturated steam from a working fluid according to an illustrative embodiment.

FIGS. 2A-2D are various sectional views depicting steps of drilling into a magma body according to an illustrative embodiment. In particular, FIG. 2A is a simplified sectional view depicting the drilling of a borehole 202 by advancing a drill bit 204 from the surface 205 and through a rock layer 206 and into a magma body 100. The borehole 202 is depicted as a partially cased borehole that includes casing 209, but can be an open borehole, as depicted in FIG. 3, or a fully cased borehole, as depicted in FIG. 9.

The drill bit 204 can be coupled to the end of a drill stem 208 that can, in some embodiments, also convey a drilling fluid 210, which is represented by an arrow, to the terminal end of the borehole 202. The drilling fluid 210 cools the drill bit 204 and lifts cuttings out of the borehole 202. As the drill bit 204 approaches the magma body 100, the drilling fluid 210 causes the magma to rapidly release its latent heat of crystallization into the drilling fluid 210, which causes the magma to crystallize or solidify ahead of the drill bit 204, thereby allowing the drill bit 204 to continue cutting the borehole 202 through the magma body 100 until the borehole 202 reaches a desired depth. In this way, the borehole 202 can be drilled into the magma body 100 without exposing the drill bit 204 to the potentially destructive environment of liquid magma.

The drilling fluid 210 can stabilize the borehole 202 and control swelling of the formation into the borehole 202. The drilling fluid 210 can also transfer horsepower through hydraulic pressure, which can facilitate down hole motor drive. Down hole motor drive can be used for directional drilling of boreholes, as depicted in wells 1100 and 1300 in FIGS. 11 and 13, respectively. The hydraulic pressure also reduces the effects of drilling into pockets of pressurized gas that could expand into the borehole 202.

Drilling into a magma body 100 requires a drilling fluid 210 that can adequately conduct the latent heat of magma to maintain the magma in crystalline form. Latent heat is the energy supplied to or extracted from a material to change a phase of the material, i.e., from liquid to solid state. The heat content of magma, which includes a latent heat component and a sensible heat component, i.e., the heat that can be sensed or measured, is a thermodynamic quantity that is based at least in part on mass, pressure, volatile content, and mineral composition. Thus, the heat content of magma can vary. The drilling fluid 210 has properties (e.g., of mass, thermal conductivity, and viscosity) that facilitate the withdrawal of a sufficient amount of heat through conduction. While the composition of magma and the crystallization pressures, heat, and rheological dynamics may be described by solidification fronts and Bowen's Reaction Series, the following generalizations can be made for exemplary purposes: the latent heat of crystallization of an average silicate magma is about 270 joules per gram, and the heat capacity is approximately 1.24 J/g ° C. with a mean density of 2.5 g/cm$^3$. Using these exemplary properties of magma, the total heat released by magma cooling from a starting temperature of 850° C. to 300° C. is 960 J/g. The drilling fluid 210 is able to accommodate this amount of heat transfer to maintain the integrity of the borehole 202 during drilling.

Examples of drilling fluid 210 can include water and brine. Additionally, the drilling fluid 210 can be a water-based mud, oil-based mud, or gaseous drilling fluid, i.e., the drilling fluid 210 can be formed from a base liquid that is oil, water, or brine. The base liquid can be formed from 80-90% of the drilling fluid by weight percent. The drilling fluid 210 can also include additives that may assist with drilling but be problematic for use in power generation. The additives can be active solids or inert solids. Active solids can include clays and polymers to create a colloidal suspension that increases the viscosity of the drilling fluid. Inert solids are added to the drilling fluids by cuttings from the drilling operations, or by the addition of solids such as barite. The inert solids add density to the drilling fluid without affecting the viscosity of the drilling fluid.

A sufficient quantity of drilling fluid 210 should be provided during drilling so that the drilling fluid will not undergo a phase change from liquid to gas at the interface between the drill bit 204 and the crystallized magma. The liquid phase of the drilling fluid is preferred so that the drilling fluid can continue to efficiently remove the latent heat from the crystallized magma through conduction. In some cases, the drilling fluid 210 may be water in the gaseous state or the liquid state that is provided at a sufficiently high rate to maintain a crystallized borehole 202. In another case, the drilling fluid 210 may be mud.

The depth of the borehole 202 can be determined by length. In another embodiment, the depth of the borehole 202 can be determined by an amount of heat provided by the borehole 202. For example, the heat provided by the borehole 202 should be high enough to heat a working fluid 212, represented by an arrow in FIG. 2B, to a temperature sufficient to cause a phase change from a liquid phase to a gaseous phase, but also allow it to maintain a sufficiently high temperature and pressure so that the working fluid 212 can rise up through the borehole 202 with enough heat so that it can be used to generate renewable energy at a power plant or put to some other use.

FIG. 2B is a simplified sectional view depicting the extraction of the drill bit 204 from the finished borehole 202. Once the borehole 202 has reached a desired depth, the drill bit 204 can be withdrawn by withdrawing the drill stem 208. In the absence of a thermodynamic fluid in the borehole 202, like drilling fluid 210 or working fluid 212, the magma body 100 would cause the terminal end of the borehole 202 in the magma body 100 to collapse. Thus, to maintain the integrity of the sidewalls of the borehole 202 in the magma body 100, i.e., to prevent the sidewalls of the borehole 202 from melting and/or collapsing, the drilling fluid 210 can continue to be introduced into the borehole 202 as the drill bit 204 is extracted from the borehole 202. In one embodiment, the drilling fluid 210 can continue to be introduced into the borehole 202 through the drill stem 208 as the drill bit 204 is removed from the borehole. In another embodiment, as the drill bit 204 is being extracted from the borehole 202, a fluid conduit 214 can be inserted into the borehole 202 to continue the supply of drilling fluid 210 into the borehole 202. Alternatively, the fluid conduit 214 can begin to supply a working fluid 212 into the borehole 202 to maintain the integrity of the borehole 202 as the drill bit 204 is being withdrawn and while the borehole 202 is capped with a wellhead 700 (see FIG. 7A-C) to form well 200, shown in FIGS. 2C and 2D. The working fluid 212 can be supplied from a fluid reservoir 216 and extracted from the well as gaseous phase working fluid 212'.

The drilling fluid 210 may be substituted with a working fluid 212 with properties that are more favorable for power generation. Examples of working fluid 212 can include fresh water, which is preferable because it is relatively inexpensive, abundant, and non-polluting. The drilling fluid 210 may be replaced by a working fluid 212 after drilling operations have ceased.

FIG. 2C is a simplified sectional view of a well 200 that depicts the introduction of working fluid 212 into the fluid conduit 214 to purge the drilling fluid 210 from the borehole 202. The working fluid 212 can be stored in a fluid reservoir 216 and introduced into the borehole 202 through a fluid conduit 214.

Figure 2D:
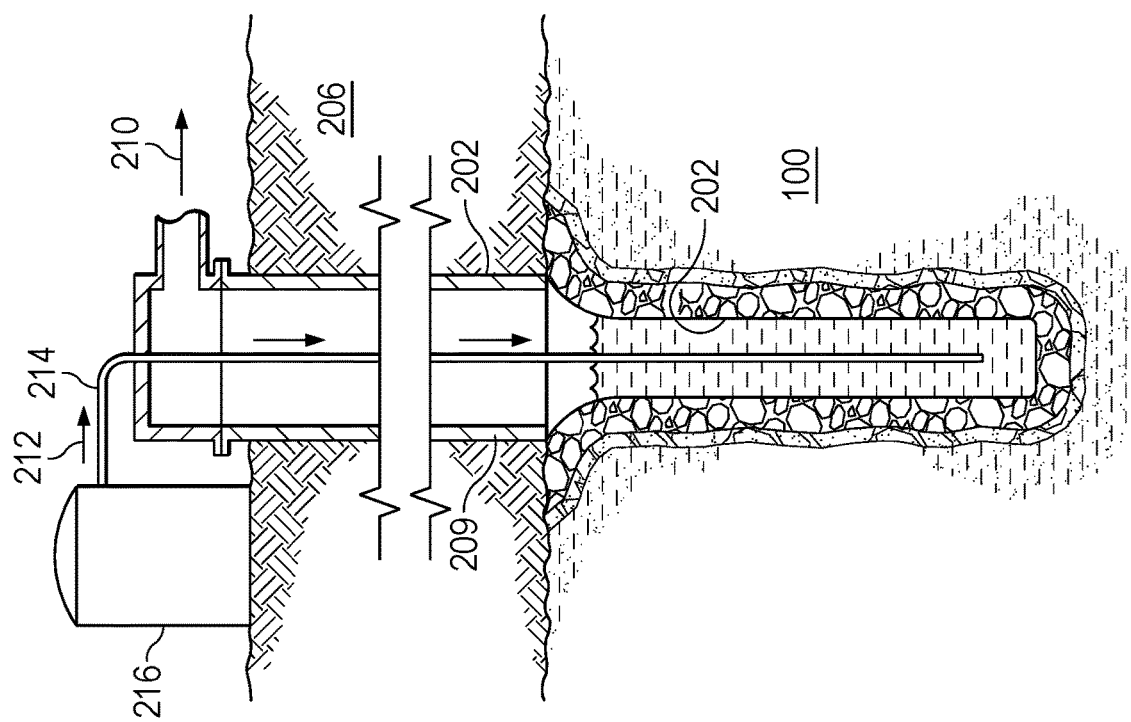
Figure 3:
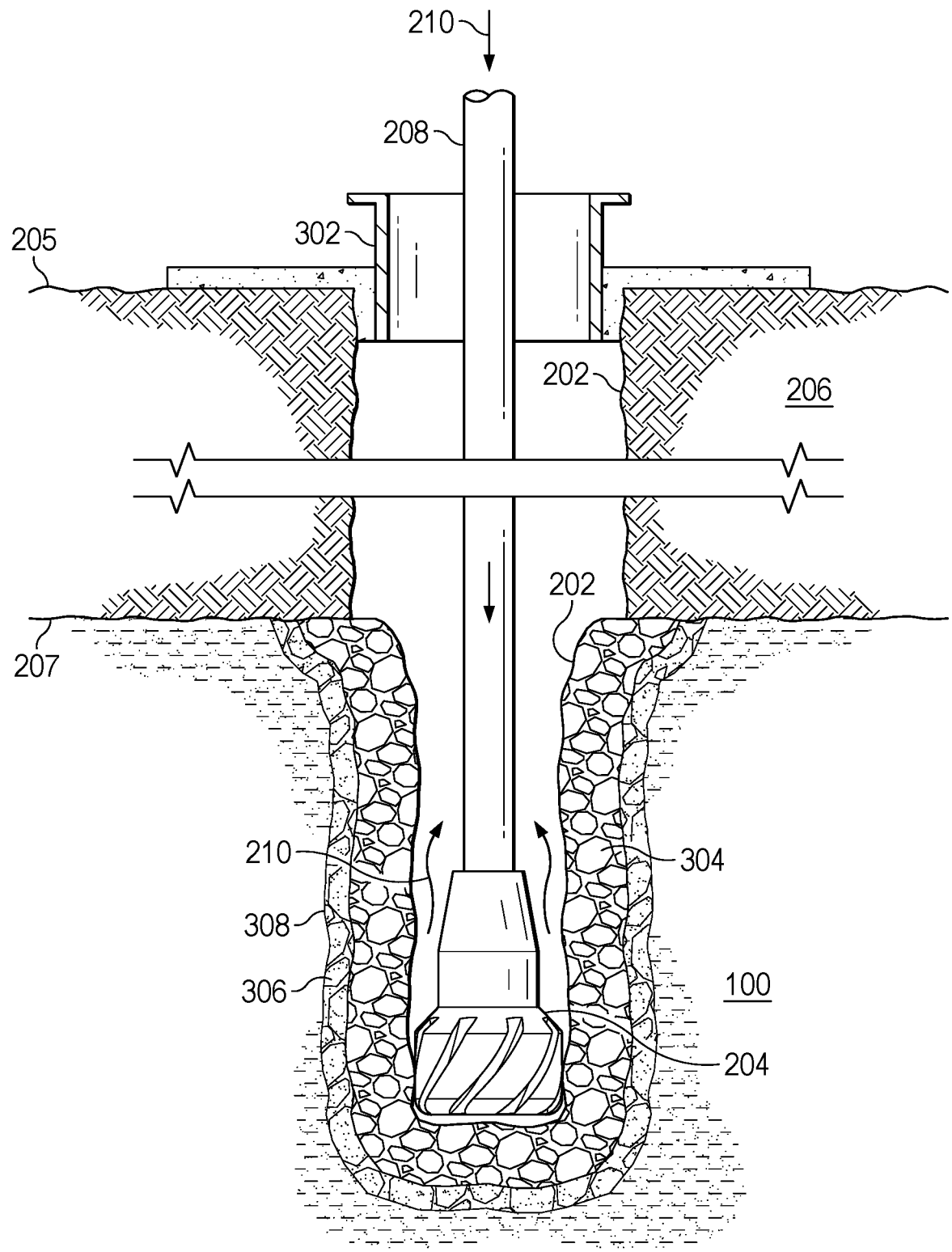
FIG. 3 is a simplified sectional view of an open wellbore being drilled into a magma body according to an illustrative embodiment.

FIG. 2D is a simplified sectional view of a completed well generating steam, or another heated working fluid 212, from a working fluid 212. As an example, working fluid 212 may be provided from the fluid reservoir 216 and conveyed into the borehole 202 in the liquid phase. Heat from the magma body 100 is absorbed by the working fluid 212, which causes the working fluid 212 to rise up through the borehole 202. The working fluid 212 changes from the liquid phase into the gaseous phase, which can then be used to generate electricity from a power plant (not shown). The spent steam can be condensed and returned to the fluid reservoir 216 for reintroduction into the borehole 202.

FIG. 3 is a simplified sectional view of an open wellbore being drilled into a magma body according to an illustrative embodiment. The borehole 202 extends from the surface 205, through a rock layer 206, past a magma ceiling 207, and into a magma body 100. In FIG. 3, the borehole 202 includes a conductor 302 at the surface 205, which can be used to mount the wellhead (e.g., wellhead 700 of FIG. 7A-C) once drilling operations have ceased. In cased wellbores, the casing 209 can be suspended from the conductor 302.

The drilling fluid 210 introduced into the borehole 202 forms a temperature gradient in the magma body 100 which may be manifested as a layered boundary that includes a fractured rock zone 304 encircled by a plastic semi-crystallization zone 306. A magma chamber wall 308 separates the plastic semi-crystallization zone 306 from the magma in the magma body 100.

Figure 4A:
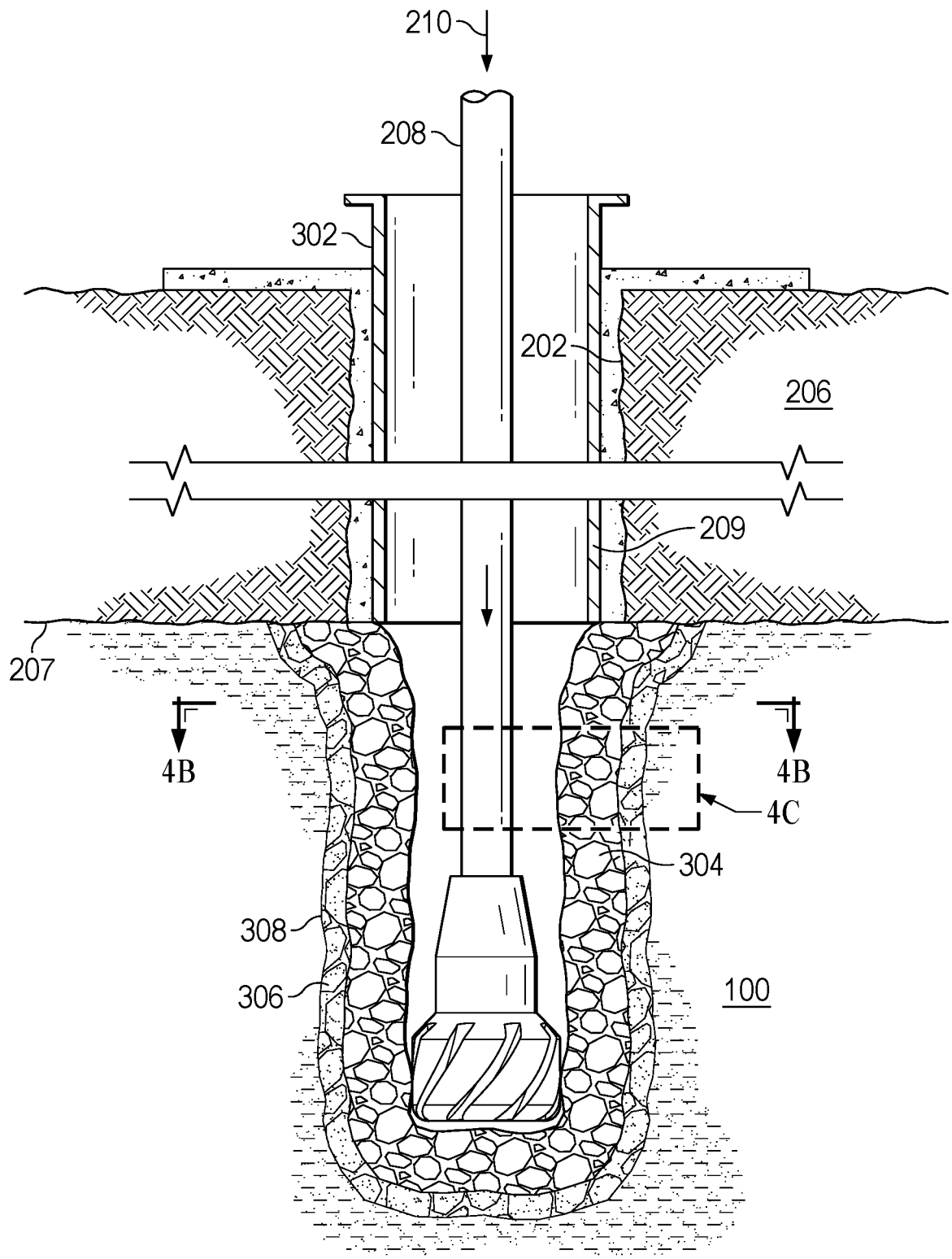
FIGS. 4A-4C are various sectional views of a partially cased wellbore according to an illustrative embodiment.
Figure 4B:
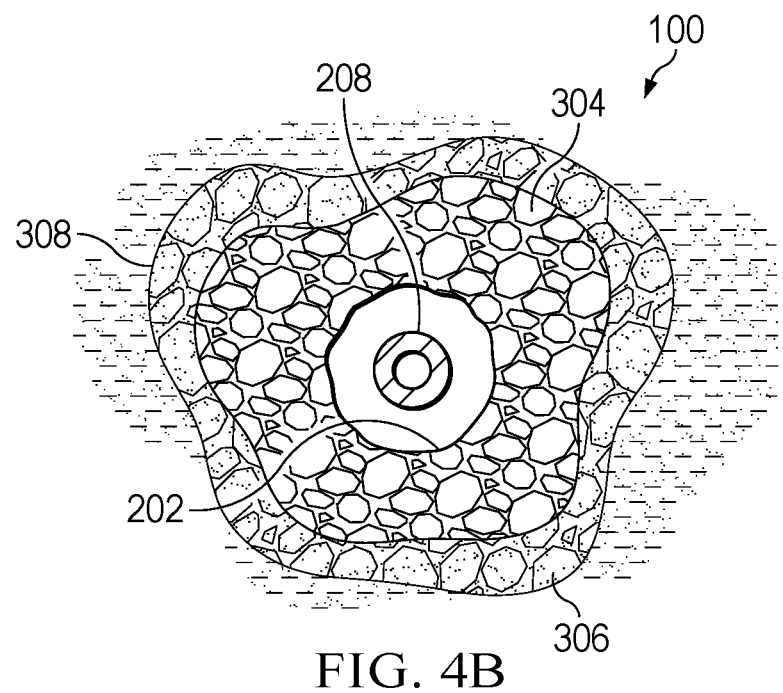
Figure 4C:
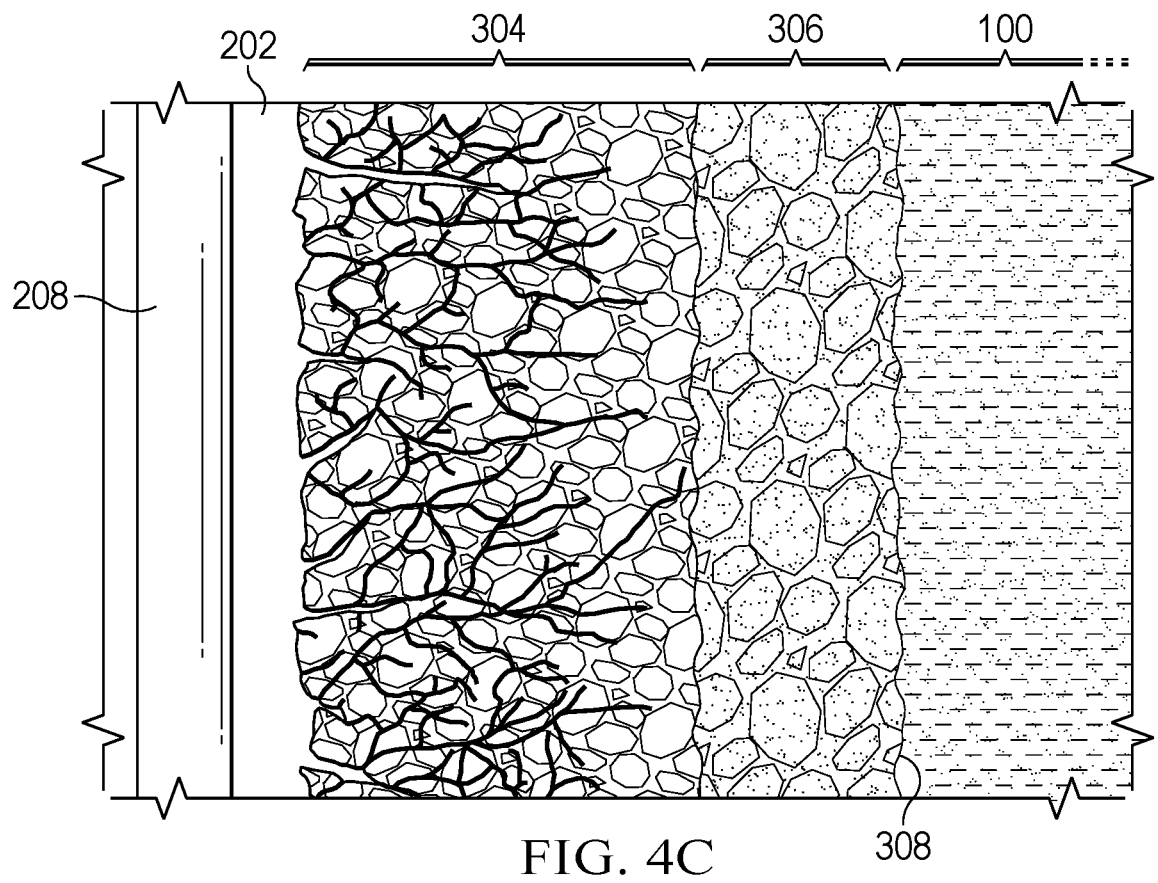

FIGS. 4A-4C are various sectional views of a partially cased wellbore according to an illustrative embodiment. In particular, FIG. 4A is a simplified sectional view of a partially cased wellbore being drilled into a magma body according to an illustrative embodiment. FIG. 4B is a cross-sectional view of the partially cased wellbore in FIG. 4A taken along line 4B-4B, and FIG. 4C is a more detailed depiction of the layered boundary between the borehole 202.

The borehole 202 shown in FIG. 4A extends from a surface 205 through a rock layer 206, past a magma ceiling 207, and into a magma body 100. The borehole 202 is partially cased, i.e., only cased throughout the rock layer 206 using casing 209. The borehole 202 is uncased in the magma body 100.

In the cross-sectional view shown in FIG. 4B, the drill stem 208 is located substantially centrally within the borehole 202. During drilling, the interior volume of the drill stem 208 can convey a drilling fluid 210 from the surface 205 into the borehole 202, and the volume bounded by the exterior surface of the drill stem 208 and the walls of the borehole 202 can be filled with drilling fluid 210, which carries cuttings to the surface 205. The layered boundary encircling the borehole 202, i.e., the fractured rock layer 304, the plastic semi-crystallization zone 306, and the magma chamber wall 308, is shown as a series of substantially concentric rings. The interfaces between the various layers of the layered boundary are shown in more detail in FIG. 4C.

Figure 5:
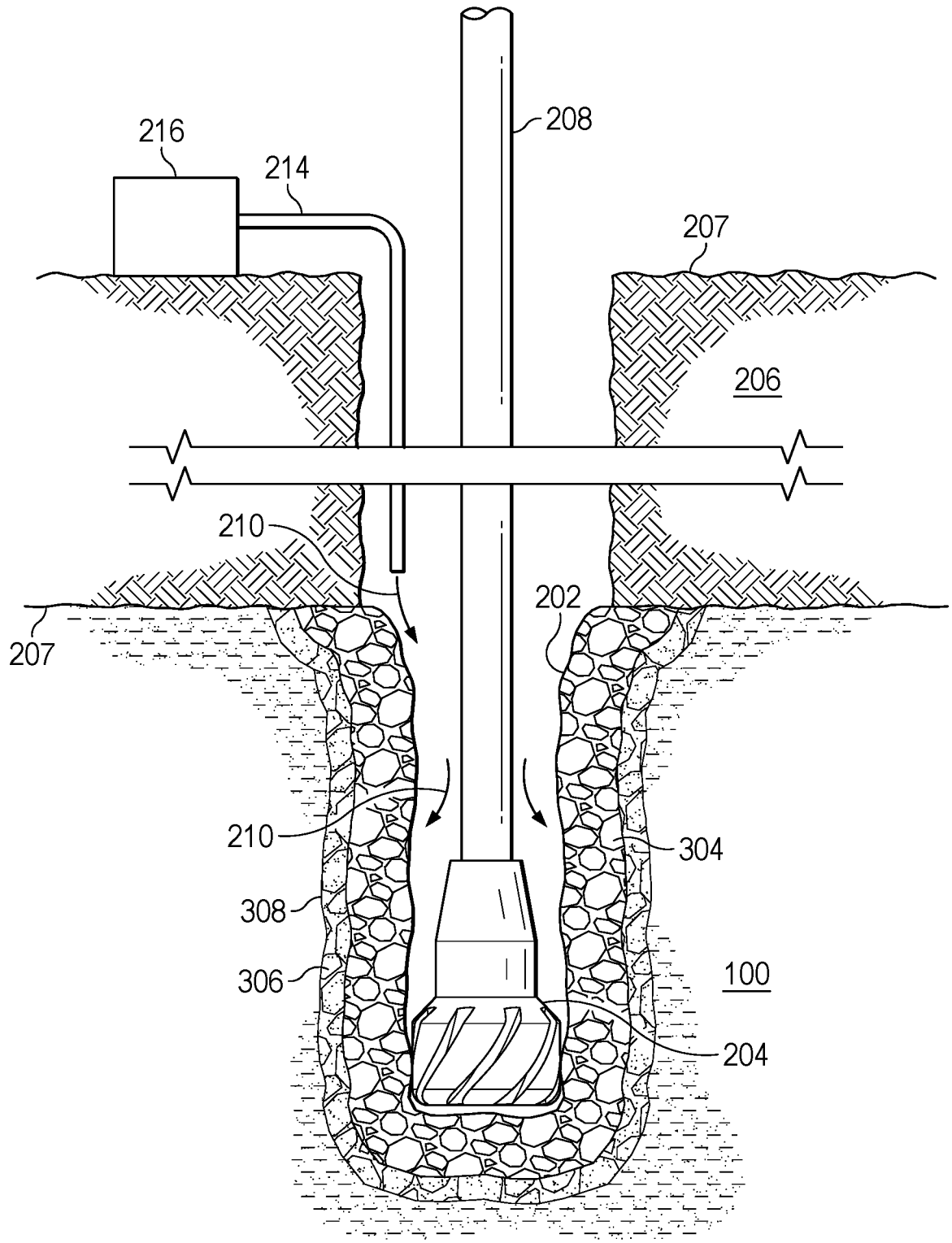
FIG. 5 is a simplified sectional view of a borehole drilled into a magma body according to an illustrative embodiment.

FIG. 5 is a simplified sectional view of a borehole 202 drilled into a magma body 100 according to an illustrative embodiment. Drill bit 204, which is attached to drill stem 208, drills the borehole 202 from the surface 205 through a rock layer 206 and into or near a magma body 100. A drilling fluid 210 is supplied through the drill stem 208 and to the interface between the drill bit 204 and the terminal end of the borehole 202. The drilling fluid 210 can quench the magma in the magma body 100 to form a solid phase material that can be cut by the drill bit 204, and the thermodynamic fluid can also lift the cuttings out of the borehole 202.

In some embodiments, additional fluid can be provided to the borehole 202 to help maintain the integrity of the sidewalls, i.e., to prevent the sidewalls of borehole 202 in the magma body 100 from re-melting, in the event that the drilling fluid 210 provided from the drill stem 208 is insufficient. In one embodiment, the additional fluid is additional drilling fluid 210 provided from fluid reservoir 216 located on the surface 205 and supplied through a fluid conduit 214 that directs the drilling fluid 210 along the sidewalls of the borehole 202. The drilling fluid 210 can be supplied even after the drilling operations have stopped to allow the wellbore 200 to be completed. For example, the drilling fluid 210 can be supplied from the fluid conduit 214 while the drill stem 208 and drill bit 204 are removed from the borehole 202. The drilling fluid 210 can also be supplied to allow the borehole 202 to be cased if the borehole 202 was not cased during drilling operations.

If the resultant well is uncased or partially cased, then the supply of drilling fluid 210 can be stopped once the working fluid 212 can be supplied. In some embodiments, the fluid conduit 214 can be two or more conduits for supplying different thermodynamic fluids to the borehole 202. For example, drilling fluid 210 can be supplied through one of the conduits during drilling. The supply of drilling fluid 210 can be ceased after drilling so that a supply of working fluid 212 can be supplied in preparation for power generation, amongst other suitable processes.

If the resultant well is the fully cased wellbore, such as the geothermal wellbore 900 in FIG. 9, then the drilling fluid 210 can be supplied to the annular region between the sidewall of the borehole 202 and the outer surface of the casing to prevent the borehole from remelting and collapsing. Once the wellbore 900 has been completed, the supply of drilling fluid 210 can be stopped to allow the borehole 202 to remelt around the end of the casing at the terminal end of the borehole 202. Working fluid 212 can be supplied to the completed wellbore 900 to generate gaseous working fluid 212 for power generation, amongst other suitable processes.

Returning to FIG. 5, in some embodiments, additional drilling fluid 210 can be sprayed radially outwardly from the drill stem 208, either through apertures in the drill stem 208 or from fluid conduits (not shown) disposed around the drill stem 208. The additional drilling fluid 210 can be provided in addition to or instead of the drilling fluid 210 from the drill bit 204 or the fluid conduit 214.

The drilling fluid 210 and working fluid 212 can be different fluids or the same fluids. In some embodiments, the drilling fluid 210 and the working fluid 212 are water or comprised of water. In another embodiment, the drilling fluid 210 is a fluid with a boiling point that is less than about 150° C., or more particularly the thermodynamic fluids have a boiling point that is around 100° C. In another embodiment, the drilling fluid 210 may be a fluid with a boiling point less than 100° C.

FIGS. 6A and 6B are various simplified sectional views of a wellbore casing and a more detailed view of a casing weld according to an illustrative embodiment. In particular, FIG. 6A is a sectional view of a conductor 302 and casing 209 extending from the surface 205 through the rock layer 206, and into the magma body 100. The sectional view shows the location of a weld 600 between the conductor 302 and casing 209. FIG. 6B shows a more detailed view of the weld 600. In a non-limiting embodiment, the conductor 302 and casing 209 have a beveled edge at the interface at the joint, which can provide a greater surface area for contacting the weld 600.

FIGS. 7A-7C are various views of a wellhead that can be used to cap off a wellbore according to an illustrative embodiment. In particular, FIG. 7A is an elevation view of the wellhead 700 shown attached to a conductor 302 suspended within the borehole 202. FIG. 7B is a plan view of the wellhead 700 and FIG. 7C is another elevation view of the wellhead 700 looking into the flange 706.

The wellhead 700 is attached to the conductor 302 by a mounting flange 704. The fluid conduit 702 passing through the wellhead 700 introduces fluids into the borehole 202, such as a working fluid 212. The gaseous phase of the working fluid 212 rises up from the borehole 202 and into the wellhead 700 and extracted through the outlet defined by flange 706. The flange 706 can be connected to a wing valve 708 for controlling the flow of gas to a power plant (not shown).

Figure 8:
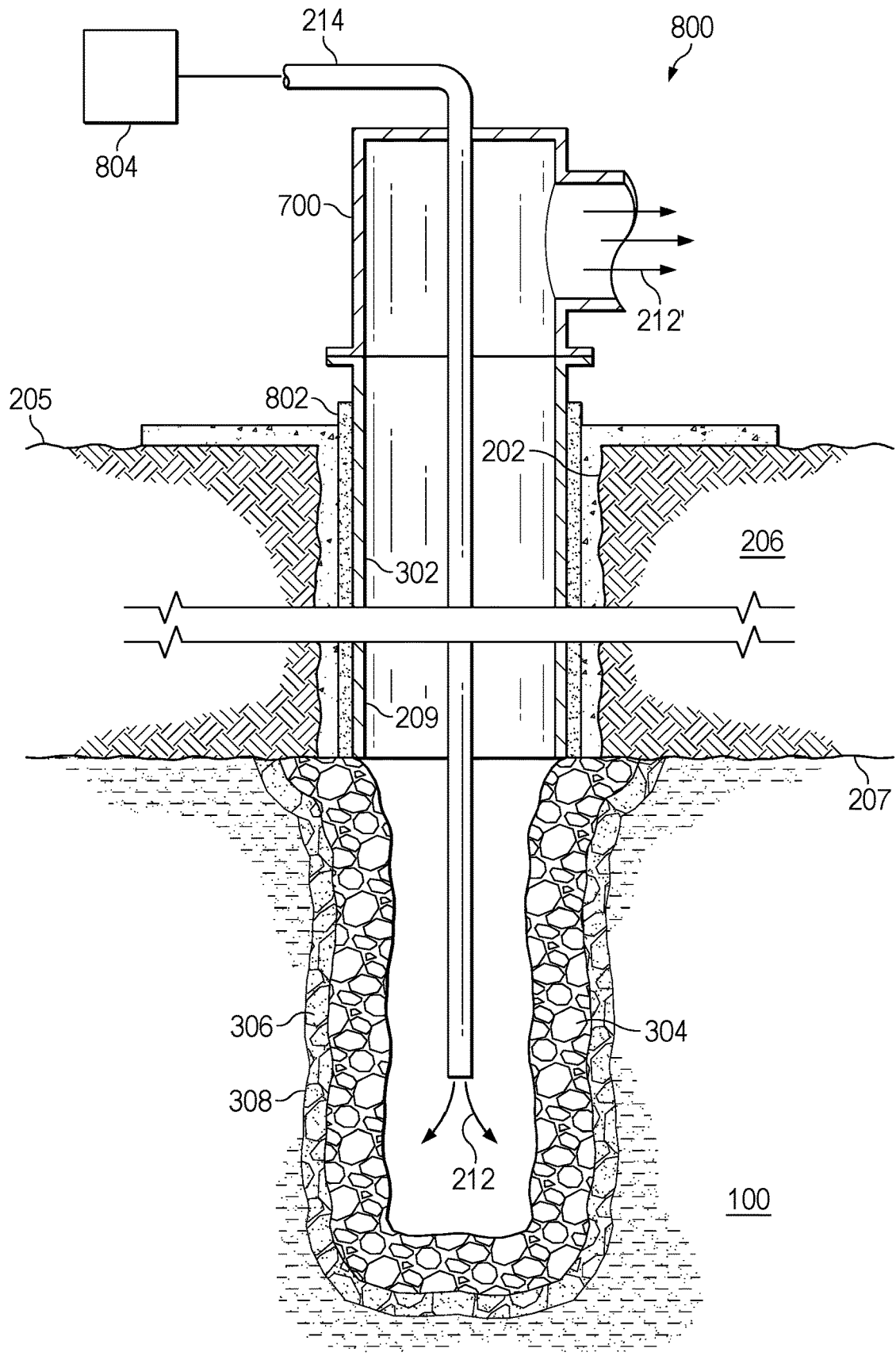
FIG. 8 is a simplified sectional view of a partially cased wellbore producing saturated steam from a working fluid according to an illustrative embodiment.

FIG. 8 is a simplified sectional view of a partially cased wellbore producing saturated steam from a working fluid according to an illustrative embodiment. Wellbore 800 is a partially cased wellbore with the casing 209 suspended in borehole 202 that extends from the surface 205, through a rock layer 206, and into a magma body 100. The casing 209 extends no further than a magma ceiling 207 of the magma body 100 so that the portion of the borehole 202 extending into the magma body 100 remains uncased. A fluid conduit 214 is disposed within the wellbore 800 to supply a working fluid 212 to the end of borehole 202, which is the heat exchange region of the wellbore 800. In the heat exchange region of the wellbore 800, the working fluid 212 absorbs heat and is converted to the gaseous phase working fluid 212', which can be saturated steam in the embodiment where the working fluid 212 is water. The gaseous phase working fluid 212' that travels up the wellbore 800 to the surface 205 is collected at the wellhead 700 and directed to power plant (not shown) for use in generating electricity and/or other products.

In a non-limiting embodiment, the wellbore 800 depicted in FIG. 8 is configured to maintain a back pressure that is at least 1000 pounds per square inch (PSI), and in a more particular embodiment, the wellbore 800 is configured to maintain a back pressure that is at least 2000 PSI. The magnitude of the back pressure is necessary to create a continuous flow of working fluid 212 from a source, such as fluid reservoir 216, down the fluid conduit 214 and into the terminal end of the borehole 202, back up the borehole 202, and to a power plant, e.g., a steam processing facility (not shown), and optionally from the steam processing facility back to the source. The back pressure can be maintained in the wellbore 800 using conventional equipment, such as one or more pumps, gauges, and back pressure regulators, represented generally by pressure generator 804. In this illustrative embodiment in FIG. 8, the pressure generator 804 is connected to the fluid conduit 214 that feeds the working fluid 212 into the wellbore 800. Other systems can be substituted which provide the requisite back pressure in wellbore 800.

Additionally, the casing 209 of the wellbore 800 has a sufficient thickness and/or composition to sustain the high temperature and pressure exerted by the fluids conveyed in its interior. In some embodiments, the casing 209 is also wrapped with an insulation layer 802, at least at an end closest to the surface 205. The insulation layer 802 reduces the loss of heat to reduce the amount of gaseous phase working fluid 212' that transforms back to condensate in the upper portions of the borehole 202. Although not shown, the fluid conduit 214 can be provided with one or more insulating layers to prevent undesirable heat exchange with between the working fluid inside and outside of the fluid conduit 214.

FIG. 9 is a simplified sectional view of a cased wellbore producing saturated steam from a working fluid according to an illustrative embodiment. Wellbore 900 is like wellbore 800 in FIG. 8 but differs in that the casing 209 extends from the surface 205 past the magma ceiling 207 and into the magma body 100 and is sealed at the terminal end by an endcap 904. In this illustrative embodiment, the casing 209 is substantially coextensive with the entire length of the borehole 202. Once the casing 209 has been installed, the crystalized magma can melt and reform around the casing 209 as recrystallized magma. Thus, the diameter of the borehole 202 is reduced from the boundary defined by the dashed line to the casing 209. The heat exchange region of the wellbore 900 coincides with the portion of the casing 209 within the magma body 100.

Figure 10:
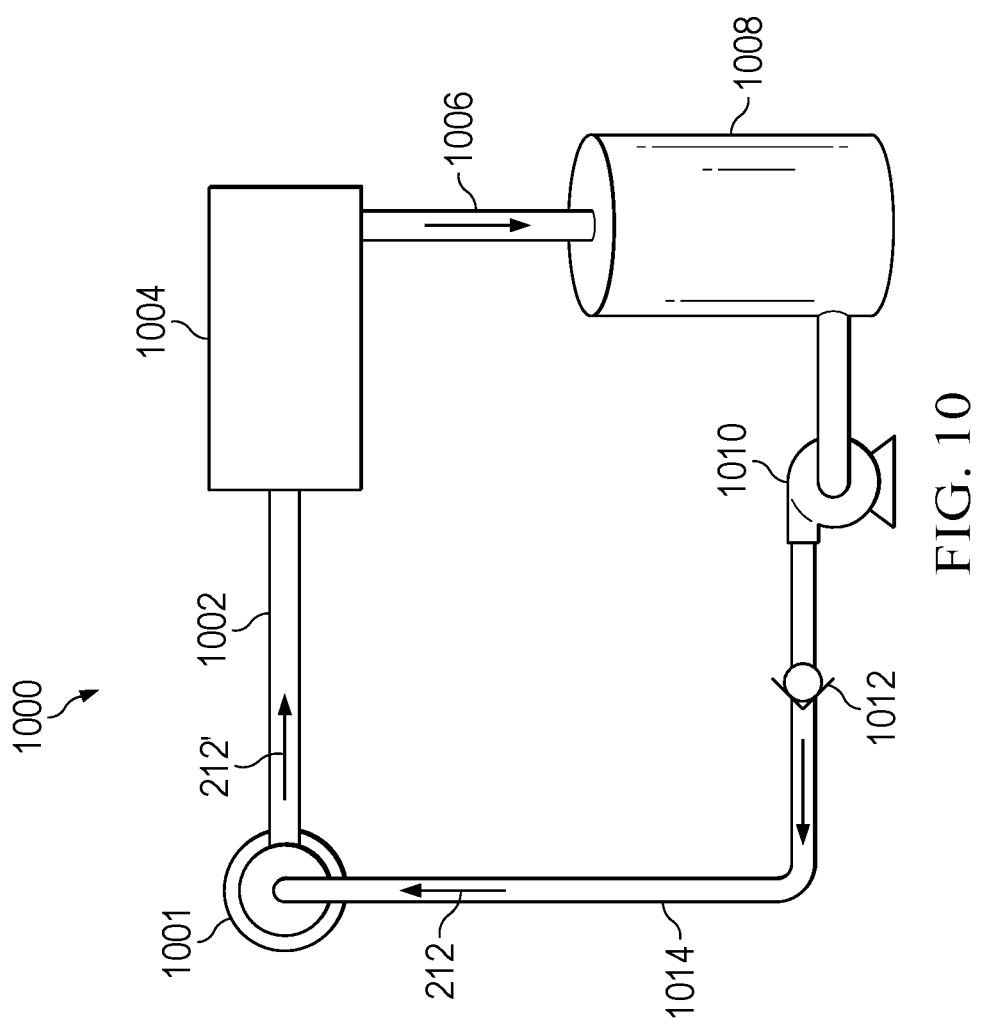
FIG. 10 is a simplified view of a system for generating renewable energy from the working fluid injected into any well of this disclosure according to an illustrative embodiment.

FIG. 10 is a simplified schematic diagram of a power generation system 1000 according to an illustrative embodiment. The system 1000 includes a geothermal well 1001, which can be any one of the geothermal wells described in this disclosure. The geothermal well 1001 generates gaseous phase working fluid 212' from a liquid phase working fluid 212. The gaseous phase working fluid 212' is sent through a fluid conduit 1002 to a power plant 1004 that can generate electricity from the gaseous phase working fluid 212'. In a non-limiting embodiment, the power plant 1004 includes one or more turbines (not shown) configured to receive high-pressure, high-temperature fluid, i.e., gaseous phase working fluid 212', to generate electricity. Working fluid condensate can be sent to the condensate tank 1008 along with spent working fluid, i.e., lower-pressure, lower-temperature gaseous phase working fluid 212', after the spent working fluid has been condensed. Fluids can be sent to the condensate tank 1008 through condensate line 1006. The liquid phase working fluid 212 can be pumped from the condensate tank 1008 via pump 1010 back into the geothermal well 1001. To prevent undesirable backflow, a check valve 1012 can be disposed in the condensate injection conduit 1014. The check valve 1012 can also be used to isolate the pump 1010 to permit servicing.

Figure 11:
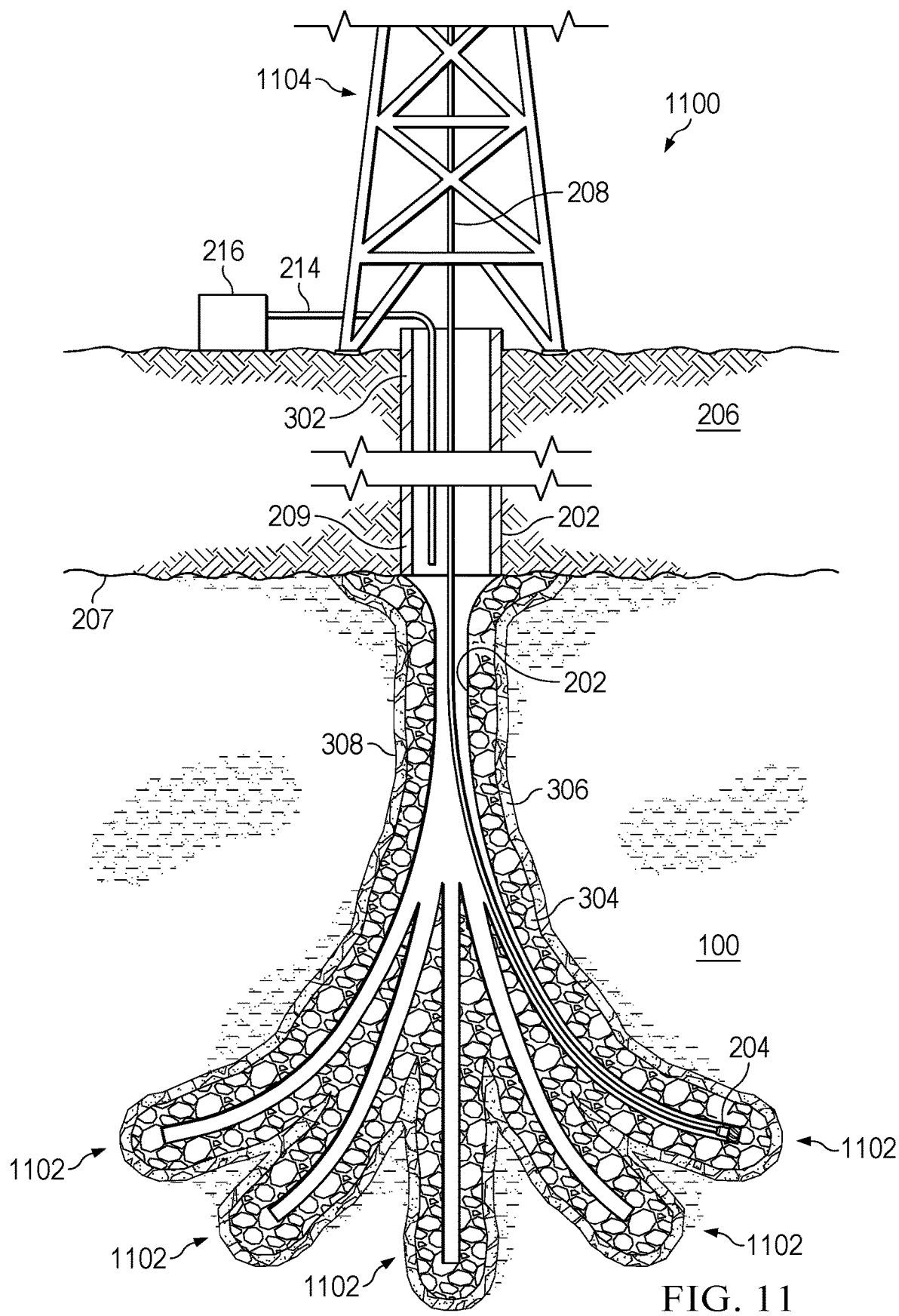
FIG. 11 is a sectional view of a partially cased geothermal well with multiple branches extending into magma according to an illustrative embodiment.

FIG. 11 is a sectional view of a partially cased geothermal well according to an illustrative embodiment. The borehole 202 of geothermal well 1100 is cased through the rock layer 206 and uncased in the magma body 100. The geothermal well 1100 differs from the previously depicted wells in that the borehole 202 transitions into a plurality of branches 1102 in the magma body 100. In a non-limiting embodiment, the plurality of borehole branches 1102 can be drilled by a drill motor (not shown) used to manipulate the orientation of a bent segment of the drill stem 208 to control the direction of the drill bit 204. In this non-limiting embodiment, the drill stem 208 is suspended by a drilling derrick 1104.

Injection of drilling fluid 210 into each of the branches during drilling solidifies the magma in the magma body 100, which allows the drill bit 204 to drill into the magma body 100. The continued introduction of drilling fluid 210 into each branch 1102 after completion maintains the integrity of the sidewalls of each branch 1102 within the magma body 100. In the illustrative embodiment in FIG. 11, a thermodynamic fluid can be introduced into the completed branches 1102 while the drill bit 204 continues to drill additional branches. The thermodynamic fluid can be stored in fluid reservoir 216 and piped into the borehole 202 through fluid conduit 214. Although fluid conduit 214 is depicted as a single fluid conduit, in another embodiment, fluid conduit 214 can be a plurality of fluid conduits, one for each branch 1102 that can extend to the mouth of each branch 1102 or at least partially into each branch 1102. The thermodynamic fluid can be the drilling fluid 210 used by the drill bit 204 to drill each of the branches 1102 of the borehole 202. In another embodiment, the thermodynamic fluid can be a different fluid than the drilling fluid 210. For example, working fluid can be injected into each of the completed branches 1102 of the borehole 202 through fluid conduit 214.

Figure 12:
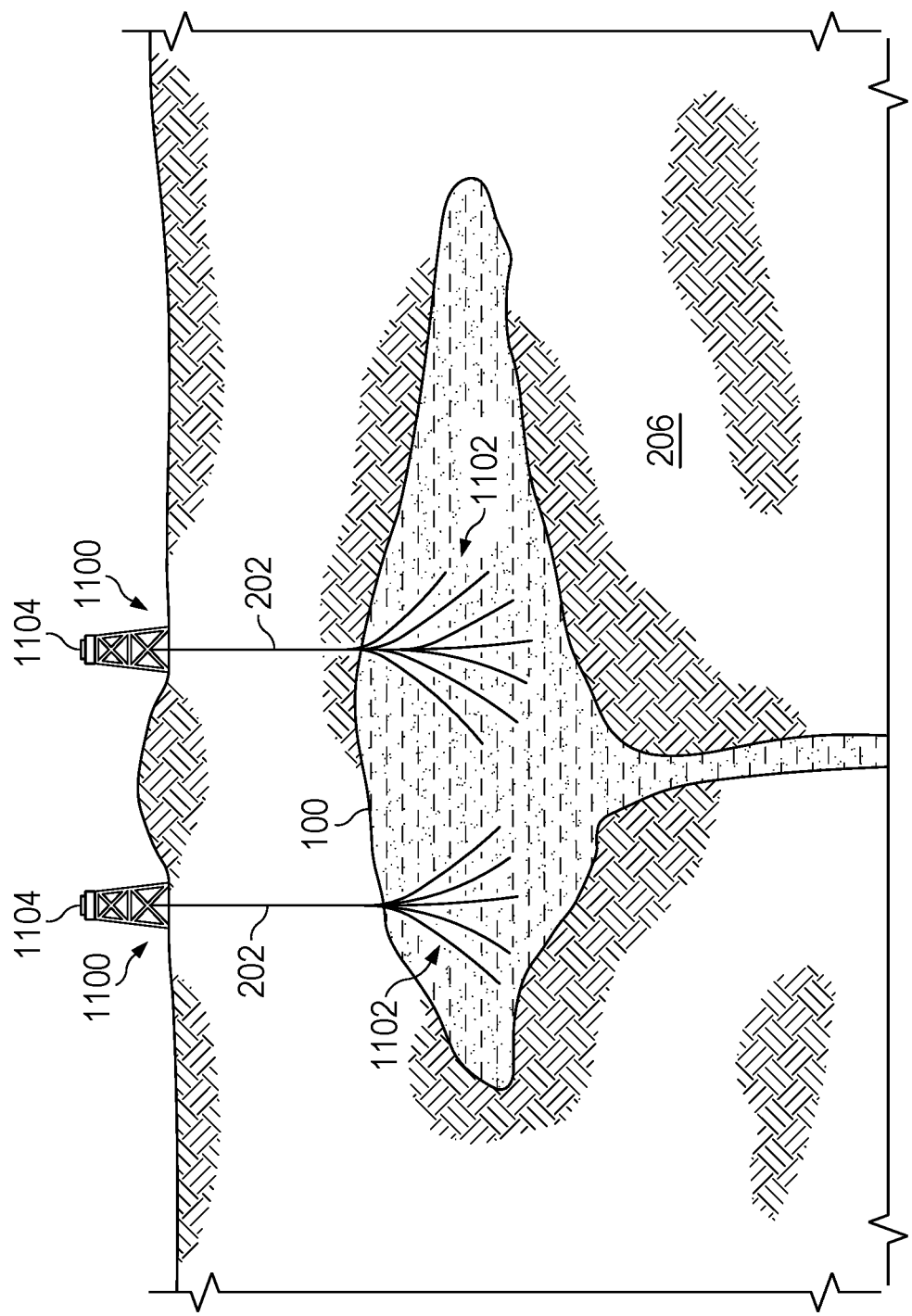
FIG. 12 depicts a plurality of geothermal wells drilled into the same magma body 100 in accordance with an illustrative embodiment.
Figure 13:
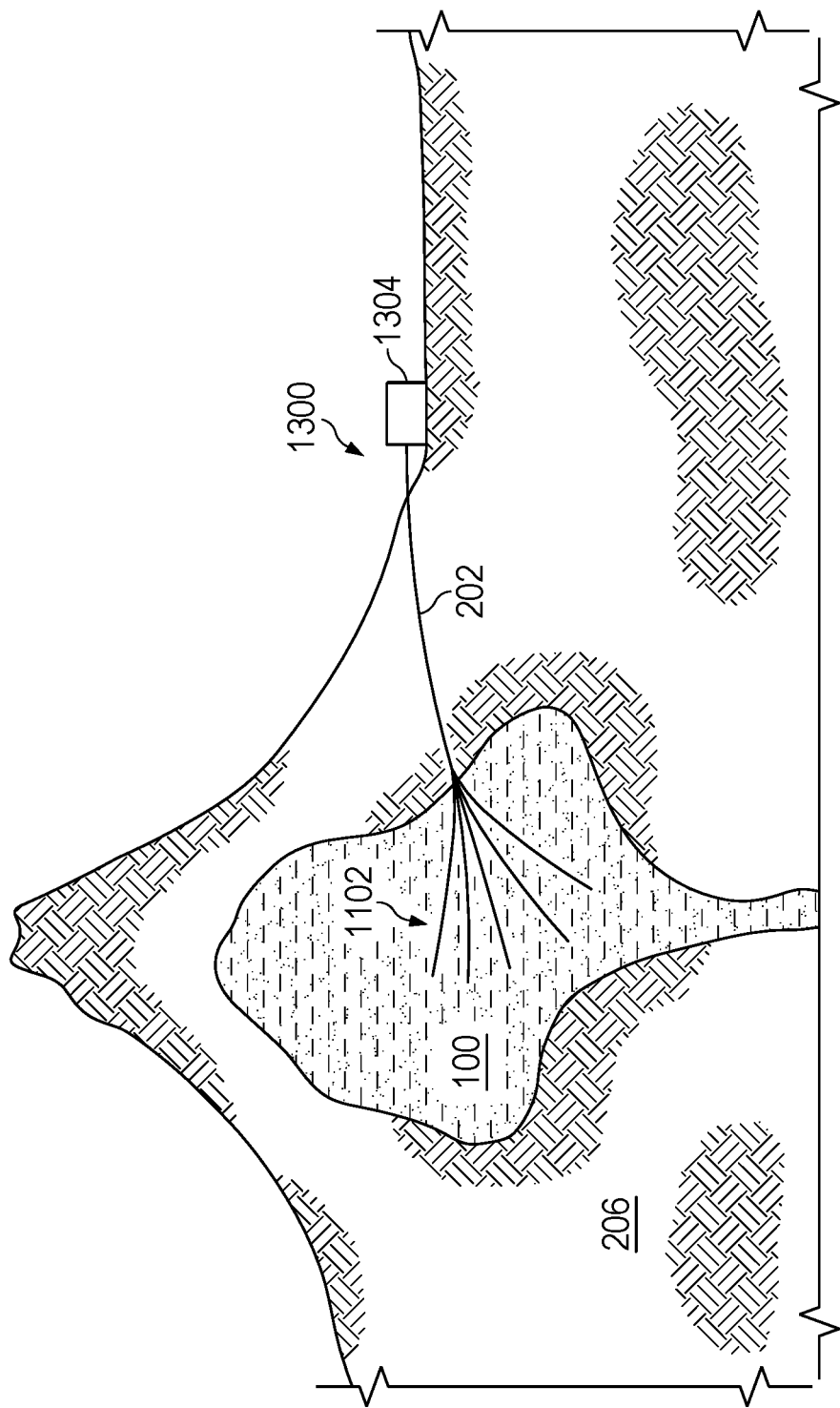
FIG. 13 depicts a geothermal well with a borehole drilled horizontally through a rock layer and into a magma body in accordance with an illustrative embodiment.

FIGS. 12 and 13 are diagrams depicting different embodiments of geothermal wells having a branched wellbore. In particular, FIG. 12 depicts a plurality of geothermal wells 1100 drilled from the surface 205 through rock layer 206 and into the same magma body 100. Within the magma body 100, each of the boreholes 202 splits into a plurality of branches 1102, which can increase production capacity. FIG. 13 depicts a geothermal well 1300 with a borehole 202 drilled horizontally through a rock layer 206 and into a magma body 100. The borehole 202 can be drilled by a drill bit attached to a drill stem extending from drilling platform 1304.

Figure 14:
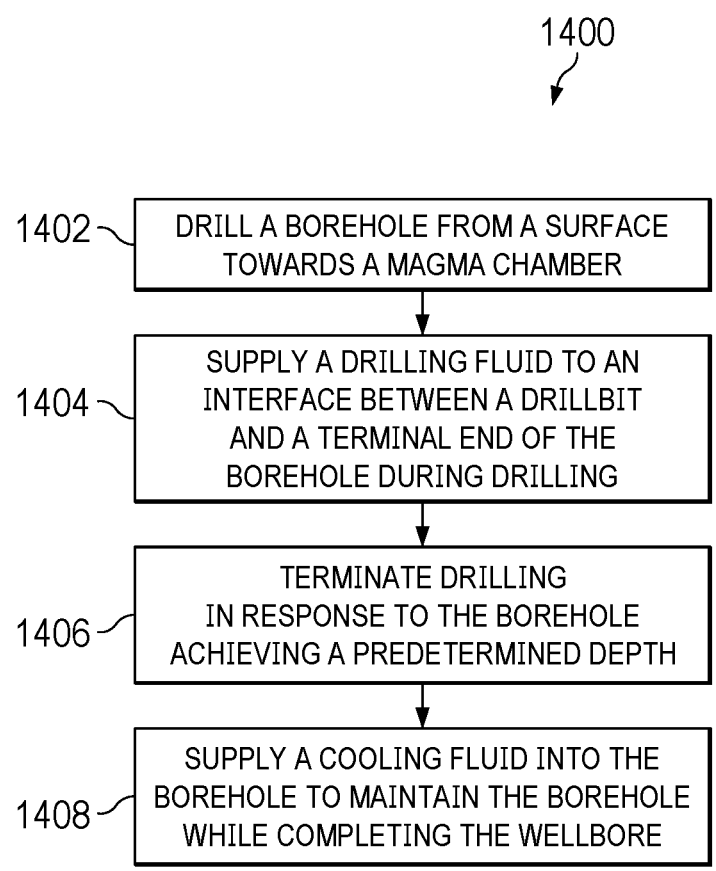
FIG. 14 is a flowchart of a process for completing a wellbore in accordance with an illustrative embodiment.

FIG. 14 is a flowchart of a process for completing a wellbore in accordance with an illustrative embodiment. The steps of flowchart 1400 can be performed to complete a wellbore, such as wellbore 800 in FIG. 8, wellbore 900 in FIG. 9, or wellbore 1100 in FIG. 11.

Flowchart 1400 begins at step 1402 by drilling a borehole from a surface towards a magma chamber. In some embodiments, the step of drilling the borehole also includes casing the borehole. The casing can be lowered into the borehole on an underreamer positioned proximate to the drill bit. The casing can terminate at or before reaching the magma ceiling of the magma chamber to form a partially cased wellbore, such as wellbore 800 in FIG. 8, or the casing can extend substantially the entire length of the borehole to form a fully cased wellbore, such as wellbore 900 in FIG. 9.

In step 1404, a drilling fluid is supplied to an interface between a drill bit and a terminal end of the borehole during drilling. In some embodiments, the drilling fluid is water and in other embodiments, the drilling fluid comprises water. The drilling fluid lifts cuttings out of the borehole, and as the borehole approaches the magma chamber and extends into the magma chamber, the drilling fluid quenches magma to form a solid phase material that can be cut by the drill bit.

In step 1406, drilling is terminated in response to the borehole achieving a predetermined depth.

In step 1408, a thermodynamic fluid is supplied into the borehole to maintain the borehole while completing the wellbore. Thermodynamic fluid can be supplied from the drill stem and/or from an auxiliary supply conduit as shown, for example, in FIG. 5. Steps for completing the wellbore can vary depending upon the type of wellbore. For example, if the wellbore is the partially cased wellbore (see example of FIG. 8), completing the wellbore can include the steps of drilling one or more borehole branches, extracting the drill stem and drill bit, casing the borehole from the surface to a depth above the magma ceiling if the borehole was not cased during drilling, capping the borehole with a wellhead, and installing a fluid conduit to supply working fluid into the wellbore. The working fluid can be supplied into the wellbore while maintaining a back pressure of at least 1000 PSI, or at least 2000 PSI within the wellbore.

If the wellbore is a fully cased wellbore (see example of FIG. 9), completing the wellbore can include the steps of extracting the drill stem and drill bit, casing the borehole from the surface to the terminal end of the borehole if the borehole was not cased during drilling, securing an end cap to the terminal end of the casing located in the magma chamber, capping the borehole with a wellhead, and installing a fluid conduit to supply working fluid into the wellbore. The working fluid can be supplied into the wellbore while maintaining a back pressure of at least 1000 PSI, or at least 2000 PSI within the wellbore. Supply of the thermodynamic fluid can be maintained in the annular region between the sidewalls of the borehole and the outer sidewalls of the casing while the wellbore is being completed, and then ceasing the supply to allow the sidewalls of the borehole to melt and reform against the sidewalls of the casing.

Additional Embodiments

The following descriptive embodiments are offered in further support of the one or more aspects of the disclosure:

In a first embodiment, the present disclosure is directed to a method for completing a wellbore for extracting heat from magma. The method includes the steps of drilling a borehole from a surface and towards a magma chamber; supplying a drilling fluid to an interface between a drill bit and a terminal end of the borehole during drilling; terminating the drilling in response to the borehole achieving a predetermined depth; and supplying a thermodynamic fluid into the borehole to maintain the borehole while completing the wellbore.

In another aspect of the first embodiment, the present disclosure is directed to a method for completing a wellbore for extracting heat from magma. The method includes the steps of drilling a borehole from a surface and towards a magma chamber; supplying a drilling fluid to an interface between a drill bit and a terminal end of the borehole during drilling; terminating the drilling in response to the borehole achieving a predetermined depth; and supplying a thermodynamic fluid into the borehole to maintain the borehole while completing the wellbore. The method also includes one or more limitations selected from the following:
  wherein supplying the thermodynamic fluid while completing the wellbore further comprises extracting a drill stem used in the drilling step and capping the borehole with a wellhead;
  wherein completing the wellbore further comprises suspending a casing from the surface at least to a ceiling of the magma chamber, and wherein capping the wellbore further comprises coupling the wellhead to an end of the casing at the surface;
  wherein the casing extends from the surface to and into the magma chamber, and wherein a terminal end of the casing is sealed with an end cap;
  wherein the thermodynamic fluid is supplied, at least in part, to an annular volume of space between the borehole and an exterior surface of the casing while securing the end cap to a terminal end of the casing;
  responsive to securing the end cap to the terminal end of the casing, stopping the flow of thermodynamic fluid into the borehole, allowing at least a portion of the borehole in the magma chamber to remelt, and supplying a working fluid into an interior volume of the casing and to the terminal end of the casing;
  wherein capping the wellbore with the wellhead further comprises inserting a fluid conduit through the wellhead and into the wellbore and to a depth that permits fluid to reach the terminal end of the conduit;
  wherein supplying the thermodynamic fluid while completing the wellbore further comprises drilling at least one other branch of the borehole;
  wherein drilling the borehole further comprises casing the borehole from the surface at least until a ceiling of the magma chamber;
  wherein casing the borehole further comprises casing an entirety of the borehole from the surface to a terminal end located in the magma chamber;
  wherein at least some of the thermodynamic fluid is supplied from the drill stem;
  wherein at least some of the thermodynamic fluid is supplied from fluid conduit passing through the wellhead and disposed within the wellbore;
  wherein the thermodynamic fluid has a boiling point less than 150° C.;
  wherein the drilling fluid comprises water, and wherein the thermodynamic fluid comprises water;
  supplying a working fluid into the wellbore while maintaining a pressure within the wellbore;
  wherein the working fluid is supplied through an insulated fluid conduit disposed within the wellbore; and
  wherein the working fluid is water.

In a second embodiment, the present disclosure is directed to a wellbore for extracting heat from magma. The wellbore includes a borehole with an opening at a surface and a terminal end at a predetermined depth within a magma chamber; a casing disposed within the borehole and extending from the surface at least until a ceiling of the magma chamber; a wellhead coupled with the casing at the surface; and a fluid conduit passing through the wellhead. The fluid conduit provides a working fluid to the terminal end of the wellbore. A pressure within the wellbore is maintained.

In another aspect of the second embodiment, the wellbore includes a borehole with an opening at a surface and a terminal end at a predetermined depth within a magma chamber; a casing disposed within the borehole and extending from the surface at least until a ceiling of the magma chamber; a wellhead coupled with the casing at the surface; and a fluid conduit passing through the wellhead. The fluid conduit provides a working fluid to the terminal end of the wellbore. A pressure within the wellbore is maintained. The wellbore also includes one or more limitations selected from the following:
  wherein the pressure within the wellbore is maintained;
  wherein the casing extends only to the ceiling of the magma body;
  wherein the casing extends from the surface to the terminal end of the borehole that terminates within the magma body;
  wherein the fluid conduit is coupled to a pressure generator to supply sufficient pressure to provide the back pressure of at least 1000 PSI;
  wherein the wellhead is coupled to a steam processing facility; and
  wherein the borehole includes a plurality of branches spreading outwardly into the magma body.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this disclosure has been particularly shown and described with reference to preferred embodiments, it will be understood by those skilled in the art that various changes in form and detail may be made therein without departing from the spirit and scope of the disclosure. The inventors expect skilled artisans to employ such variations as appropriate, and the inventors intend the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for completing a wellbore, the method comprising:
    drilling a borehole from a surface, towards a magma chamber, and into the magma chamber;
    supplying a drilling fluid to an interface between a drill bit and a terminal end of the borehole, wherein the drilling fluid lifts cuttings out of the borehole, and wherein the drilling fluid quenches magma to form a solid phase material that can be cut by the drill bit;
    terminating the drilling in response to the borehole achieving a predetermined depth;
    supplying a thermodynamic fluid into the borehole to maintain the solid phase material of the borehole while completing the wellbore, wherein the thermodynamic fluid is in contact with sidewalls of the borehole;
    casing the borehole from the surface to the terminal end of the borehole located in the magma chamber; and
    sealing a terminal end of the casing with an end cap that prevents the thermodynamic fluid from contacting the solid phase material.

2. The method of claim 1, wherein supplying the thermodynamic fluid while completing the wellbore further comprises:
    extracting a drill stem used in the drilling step; and
    capping the borehole with a wellhead.

3. The method of claim 2, wherein capping the wellbore further comprises coupling the wellhead to an end of the casing at the surface.

4. The method of claim 2, wherein capping the wellbore with the wellhead further comprises:
    inserting a fluid conduit through the wellhead and into the wellbore and to a depth that permits fluid to reach the terminal end of the fluid conduit.

5. The method of claim 2, wherein supplying the thermodynamic fluid while completing the wellbore further comprises:
    drilling at least one other branch of the borehole.

6. The method of claim 2, wherein at least some of the thermodynamic fluid is supplied from the drill stem.

7. The method of claim 2, wherein at least some of the thermodynamic fluid is supplied from fluid conduit passing through the wellhead and disposed within the wellbore.

8. The method of claim 1, wherein the thermodynamic fluid is supplied, at least in part, to an annular volume of space between the borehole and an exterior surface of the casing while securing the end cap to the terminal end of the casing.

9. The method of claim 8, further comprising:
    responsive to securing the end cap to the terminal end of the casing, stopping flow of thermodynamic fluid into the borehole;
    allowing at least a portion of the borehole in the magma chamber to remelt around the terminal end of the casing; and
    after allowing at least the portion of the borehole in the magma chamber to remelt, supplying a working fluid into an interior volume of the casing and to the terminal end of the casing, thereby causing, the remelted portion of the borehole in the magma chamber to recrystallize around the terminal end of the casing.

10. The method of claim 1, wherein the thermodynamic fluid has a boiling point less than 150° C.

11. The method of claim 1, wherein the drilling fluid comprises water, and wherein the thermodynamic fluid comprises water.

12. The method of claim 1, further comprising:
    supplying a working fluid into the wellbore while maintaining a back pressure of at least 1,000 PSI within the wellbore.

13. The method of claim 12, wherein the working fluid is supplied through an insulated fluid conduit disposed within the wellbore.

14. The method of claim 13, wherein the working fluid is water.

15. A wellbore comprising:
    a borehole with an opening at a surface and a terminal end at a predetermined depth within a magma body;
    a casing disposed within the borehole and extending from the surface and into the magma body, wherein the casing is sealed at a terminal end by an end cap that prevents the working fluid from contacting a solid phase material formed from quenched magma;
    a wellhead coupled with the casing at the surface; and
    a fluid conduit passing through the wellhead, wherein the fluid conduit provides a continuous flow of working fluid to the terminal end of the wellbore to absorb heat from the magma body to form a continuous flow of heated working fluid extracted from the wellhead, wherein the borehole is maintained with a back pressure of at least at 1000 pounds per square inch (PSI).

16. The wellbore of claim 15, wherein the fluid conduit is coupled to a pressure generator to supply sufficient pressure to provide the back pressure of at least 1000 PSI.

17. The wellbore of claim 15, wherein the wellhead is coupled to a steam processing facility, and wherein the heated working fluid is conveyed from the wellhead and to the steam processing facility.

18. The wellbore of claim 15, wherein the borehole includes a plurality of branches spreading outwardly into the magma body.

* * * * *